(12) United States Patent
Shen et al.

(10) Patent No.: US 11,036,926 B2
(45) Date of Patent: Jun. 15, 2021

(54) GENERATING ANNOTATED NATURAL LANGUAGE PHRASES

(71) Applicant: Samsung Electronics Co., Ltd., Gyeonggi-do (KR)

(72) Inventors: Yilin Shen, Mountain View, CA (US); Avik Ray, Mountain View, CA (US); Hongxia Jin, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 259 days.

(21) Appl. No.: 16/236,886

(22) Filed: Dec. 31, 2018

(65) Prior Publication Data

US 2019/0354578 A1 Nov. 21, 2019

Related U.S. Application Data

(60) Provisional application No. 62/674,397, filed on May 21, 2018.

(51) Int. Cl.
| | |
|---|---|
| G06F 40/169 | (2020.01) |
| G06F 40/40 | (2020.01) |
| G06F 40/30 | (2020.01) |
| G06F 40/20 | (2020.01) |
| G06F 16/332 | (2019.01) |

(52) U.S. Cl.
CPC ........ G06F 40/169 (2020.01); G06F 16/3329 (2019.01); G06F 40/20 (2020.01); G06F 40/30 (2020.01); G06F 40/40 (2020.01)

(58) Field of Classification Search
CPC ....... G06F 40/30; G06F 16/3329; G06F 40/20
See application file for complete search history.

(56) References Cited

U.S. PATENT DOCUMENTS

| | | | |
|---|---|---|---|
| 8,150,676 B1 * | 4/2012 | Kaeser | G06F 40/56 704/1 |
| 8,447,589 B2 | 5/2013 | Ishikawa et al. | |
| 8,880,400 B2 | 11/2014 | Hanazawa et al. | |
| 9,436,759 B2 | 9/2016 | Huang et al. | |

(Continued)

FOREIGN PATENT DOCUMENTS

| | | |
|---|---|---|
| CN | 108009155 A | 5/2018 |
| KR | 2017-0063037 A | 6/2017 |

(Continued)

OTHER PUBLICATIONS

International Search Report and Written Opinion in International Patent Application No. PCT/KR2019/014373, dated Feb. 3, 2020.

*Primary Examiner* — Samuel G Neway

(57) ABSTRACT

A system receives a phrase that includes at least one tagged object and generates instantiated phrases by instantiations of each tagged object in the phrase. The system generates lists of natural language phrases by corresponding paraphrases of each of the instantiated phrases. The system generates ordered lists of natural language phrases by ordering natural language phrases in each list of natural language phrases based on occurrences of each natural language phrase. The system generates annotated natural language phrases by using each tagged object in the phrase to annotate the ordered lists of natural language phrases or an enhanced set of natural language phrases that is based on the ordered lists of natural language phrases.

20 Claims, 22 Drawing Sheets

(56) References Cited

U.S. PATENT DOCUMENTS

| | | | |
|---|---|---|---|
| 9,703,549 B2 | 7/2017 | Durfresne | |
| 9,704,479 B2 | 7/2017 | Tsuji et al. | |
| 2007/0016401 A1 | 1/2007 | Ehsani et al. | |
| 2008/0167876 A1* | 7/2008 | Bakis | G06F 40/247 |
| | | | 704/260 |
| 2008/0270119 A1* | 10/2008 | Suzuki | G06F 40/56 |
| | | | 704/9 |
| 2011/0282856 A1* | 11/2011 | Ganti | G06F 40/247 |
| | | | 707/706 |
| 2011/0295591 A1* | 12/2011 | Fang | G06F 40/289 |
| | | | 704/9 |
| 2012/0191445 A1* | 7/2012 | Markman | G06F 40/56 |
| | | | 704/2 |
| 2012/0296635 A1* | 11/2012 | Brockett | G06F 40/131 |
| | | | 704/9 |
| 2013/0275164 A1 | 10/2013 | Gruber et al. | |
| 2013/0325442 A1 | 12/2013 | Dahlmeier et al. | |
| 2015/0127321 A1 | 5/2015 | Waibel et al. | |
| 2015/0261849 A1* | 9/2015 | Chu-Carroll | G06F 16/334 |
| | | | 707/723 |
| 2015/0286747 A1 | 10/2015 | Anastasakos et al. | |
| 2016/0004766 A1* | 1/2016 | Danielyan | G06F 40/20 |
| | | | 707/723 |
| 2016/0140958 A1* | 5/2016 | Heo | G06F 40/30 |
| | | | 704/9 |
| 2017/0091170 A1* | 3/2017 | Cardillo | G06F 40/289 |
| 2017/0147679 A1 | 5/2017 | Abdelali | |
| 2017/0220559 A1* | 8/2017 | Fujiwara | G06F 40/58 |
| 2017/0357633 A1* | 12/2017 | Wang | G06F 40/289 |
| 2019/0080688 A1* | 3/2019 | Itsui | G10L 15/197 |
| 2019/0205383 A1* | 7/2019 | Martineau | G06N 3/08 |
| 2019/0354578 A1* | 11/2019 | Shen | G06F 40/56 |

FOREIGN PATENT DOCUMENTS

| | | |
|---|---|---|
| KR | 2017-0090127 A | 8/2017 |
| KR | 2018-0062003 A | 6/2018 |

* cited by examiner

FIG. 3A

332 —
order delivery of a pizza
order delivery of a taco
order delivery of apples
which store has a sale on pizzas?
which store has a sale on tacos?
which store has a sale on apples?
where is a restaurant that serves pizzas?
where is a restaurant that serves tacos?
where is a restaurant that serves apples?
where is a store that sells pizzas?
where is a store that sells tacos?
where is a store that sells apples?
...

334 —
order delivery of a pizza (@food)
order delivery of a taco (@food)
order delivery of apples (@food)
which store has a sale on pizzas (@food)?
which store has a sale on tacos (@food)?
which store has a sale on apples (@food)?
where is a restaurant that serves pizzas (@food)?
where is a restaurant that serves tacos (@food)?
where is a restaurant that serves apples (@food)?
where is a store that sells pizzas (@food)?
where is a store that sells tacos (@food)?
where is a store that sells apples (@food)?
...

336 —
order delivery of (@find) a pizza (@food)
order delivery of (@find) a taco (@food)
order delivery of (@find) apples (@food)
which store has a sale on (@find) pizzas (@food)?
which store has a sale on (@find) tacos (@food)?
which store has a sale on (@find) apples (@food)?
where is a restaurant that serves (@find) pizzas (@food)?
where is a restaurant that serves (@find) tacos (@food)?
where is a restaurant that serves (@find) apples (@food)?
where is a store that sells (@find) pizzas (@food)?
where is a store that sells (@find) tacos (@food)?
where is a store that sells (@find) apples (@food)?
...

FIG. 3B

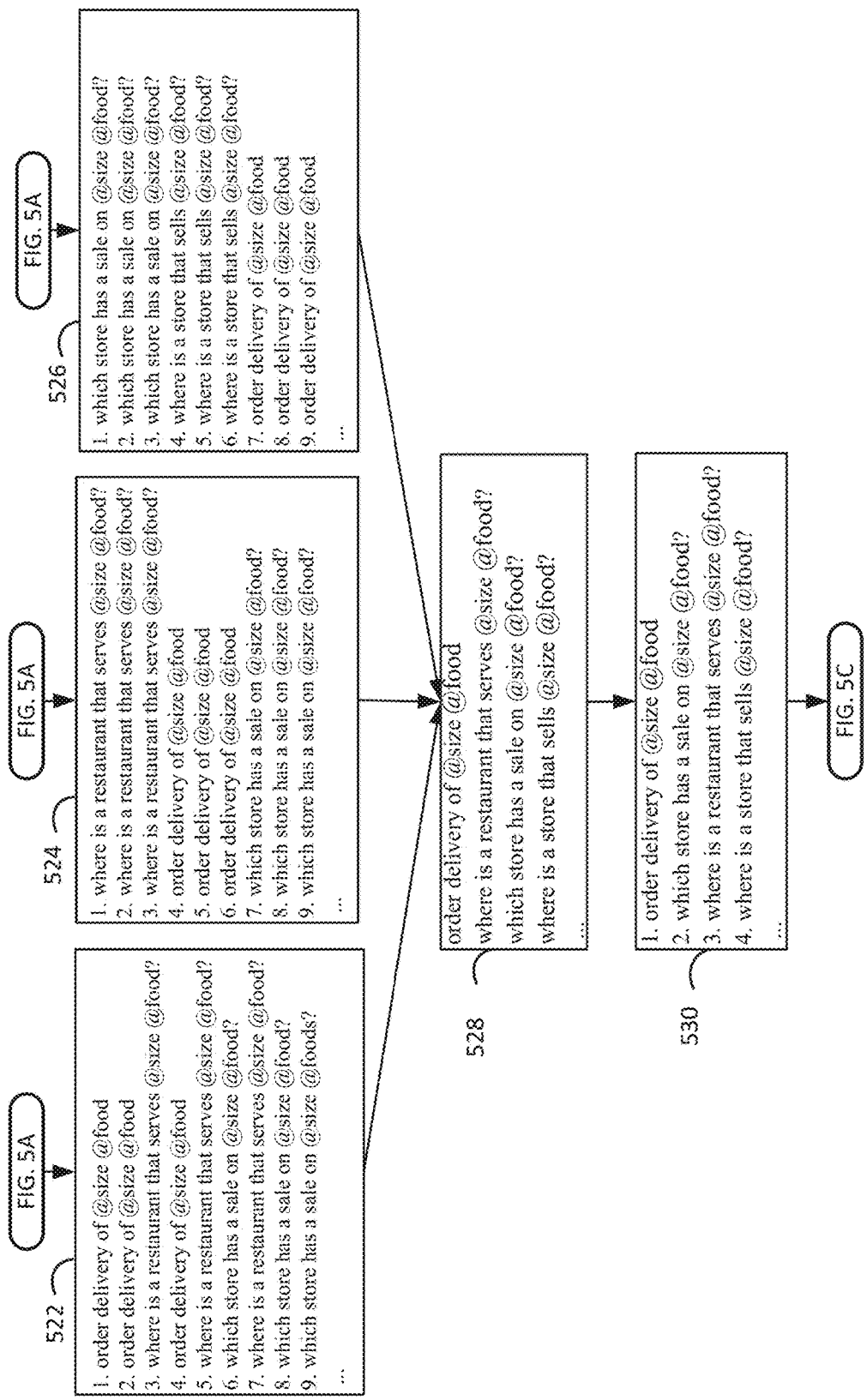

FIG. 5B

532 — order delivery of a large pizza
order delivery of a medium pizza
order delivery of a small pizza
order delivery of a large taco
order delivery of a medium taco
order delivery of a small taco
order delivery of a large apple
order delivery of a medium apple
order delivery of a small apple
which store has a sale on large pizzas?
which store has a sale on medium pizzas?
which store has a sale on small pizzas?
which store has a sale on large tacos?
which store has a sale on medium tacos?
which store has a sale on small tacos?
which store has a sale on large apples?
which store has a sale on medium apples?
which store has a sale on small apples?
where is a restaurant that serves large pizzas?
where is a restaurant that serves medium pizzas?
where is a restaurant that serves small pizzas?
where is a restaurant that serves large tacos?
where is a restaurant that serves medium tacos?
where is a restaurant that serves small tacos?
where is a restaurant that serves large apples?
where is a restaurant that serves medium apples?
where is a restaurant that serves small apples?
where is a store that sells large pizzas?
where is a store that sells medium pizzas?
where is a store that sells small pizzas?
where is a store that sells large tacos?
where is a store that sells medium tacos?
where is a store that sells small tacos?
where is a store that sells large apples?
where is a store that sells medium apples?
where is a store that sells small apples?
...

534 order delivery of a large (@size) pizza (@food)
order delivery of a medium (@size) pizza (@food)
order delivery of a small (@size) pizza (@food)
order delivery of a large (@size) taco (@food)
order delivery of a medium (@size) taco (@food)
order delivery of a small (@size) taco (@food)
order delivery of a large (@size) apple (@food)
order delivery of a medium (@size) apple (@food)
order delivery of a small (@size) apple (@food)
which store has a sale on large (@size) pizzas (@food)?
which store has a sale on medium (@size) pizzas (@food)?
which store has a sale on small (@size) pizzas (@food)?
which store has a sale on large (@size) tacos (@food)?
which store has a sale on medium (@size) tacos (@food)?
which store has a sale on small (@size) tacos (@food)?
which store has a sale on large (@size) apples (@food)?
which store has a sale on medium (@size) apples (@food)?
which store has a sale on small (@size) apples (@food)?
where is a restaurant that serves large (@size) pizzas (@food)?
where is a restaurant that serves medium (@size) pizzas (@food)?
where is a restaurant that serves small (@size) pizzas (@food)?
where is a restaurant that serves large (@size) tacos (@food)?
where is a restaurant that serves medium (@size) tacos (@food)?
where is a restaurant that serves small (@size) tacos (@food)?
where is a restaurant that serves large (@size) apples (@food)?
where is a restaurant that serves medium (@size) apples (@food)?
where is a restaurant that serves small (@size) apples (@food)?
where is a store that sells large (@size) pizzas (@food)?
where is a store that sells medium (@size) pizzas (@food)?
where is a store that sells small (@size) pizzas (@food)?
where is a store that sells large (@size) tacos (@food)?
where is a store that sells medium (@size) tacos (@food)?
where is a store that sells small (@size) tacos (@food)?
where is a store that sells large (@size) apples (@food)?
where is a store that sells medium (@size) apples (@food)?
where is a store that sells small (@size) apples (@food)?
...

536 order delivery of a (@find) large (@size) pizza (@food)
order delivery of a (@find) medium (@size) pizza (@food)
order delivery of a (@find) small (@size) pizza (@food)
order delivery of a (@find) large (@size) taco (@food)
order delivery of a (@find) medium (@size) taco (@food)
order delivery of a (@find) small (@size) taco (@food)
order delivery of a (@find) large (@size) apple (@food)
order delivery of a (@find) medium (@size) apple (@food)
order delivery of a (@find) small (@size) apple (@food)
which store has a sale on (@find) large (@size) pizzas (@food)?
which store has a sale on (@find) medium (@size) pizzas (@food)?
which store has a sale on (@find) small (@size) pizzas (@food)?
which store has a sale on (@find) large (@size) tacos (@food)?
which store has a sale on (@find) medium (@size) tacos (@food)?
which store has a sale on (@find) small (@size) tacos (@food)?
which store has a sale on (@find) large (@size) apples (@food)?
which store has a sale on (@find) medium (@size) apples (@food)?
which store has a sale on (@find) small (@size) apples (@food)?
where is a restaurant that serves (@find) large (@size) pizzas (@food)?
where is a restaurant that serves (@find) medium (@size) pizzas (@food)?
where is a restaurant that serves (@find) small (@size) pizzas (@food)?
where is a restaurant that serves (@find) large (@size) tacos (@food)?
where is a restaurant that serves (@find) medium (@size) tacos (@food)?
where is a restaurant that serves (@find) small (@size) tacos (@food)?
where is a restaurant that serves (@find) large (@size) apples (@food)?
where is a restaurant that serves (@find) medium (@size) apples (@food)?
where is a restaurant that serves (@find) small (@size) apples (@food)?
where is a store that sells (@find) large (@size) pizzas (@food)?
where is a store that sells (@find) medium (@size) pizzas (@food)?
where is a store that sells (@find) small (@size) pizzas (@food)?
where is a store that sells (@find) large (@size) tacos (@food)?
where is a store that sells (@find) medium (@size) tacos (@food)?
where is a store that sells (@find) small (@size) tacos (@food)?
where is a store that sells (@find) large (@size) apples (@food)?
where is a store that sells (@find) medium (@size) apples (@food)?
where is a store that sells (@find) small (@size) apples (@food)?
...

FIG. 5E

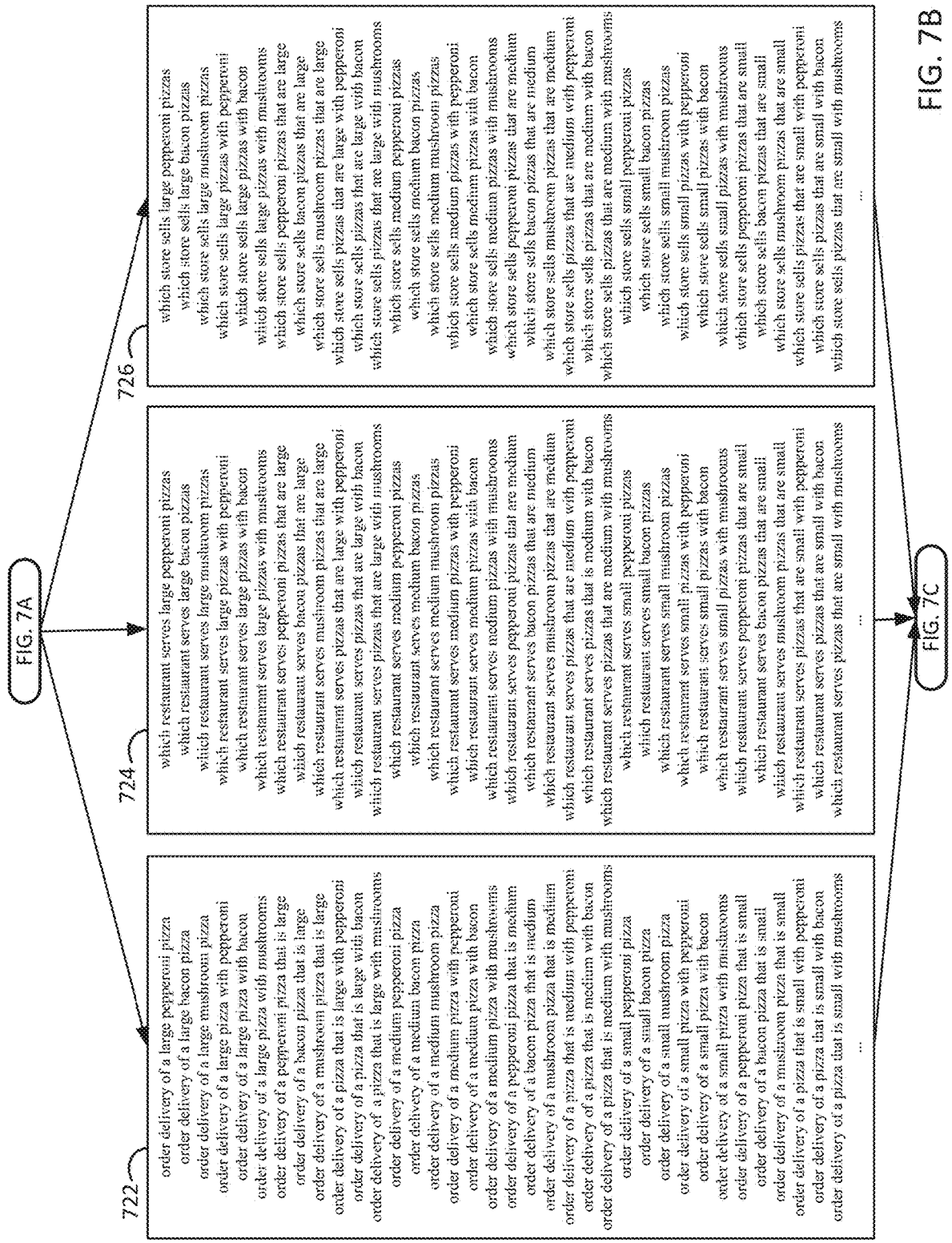

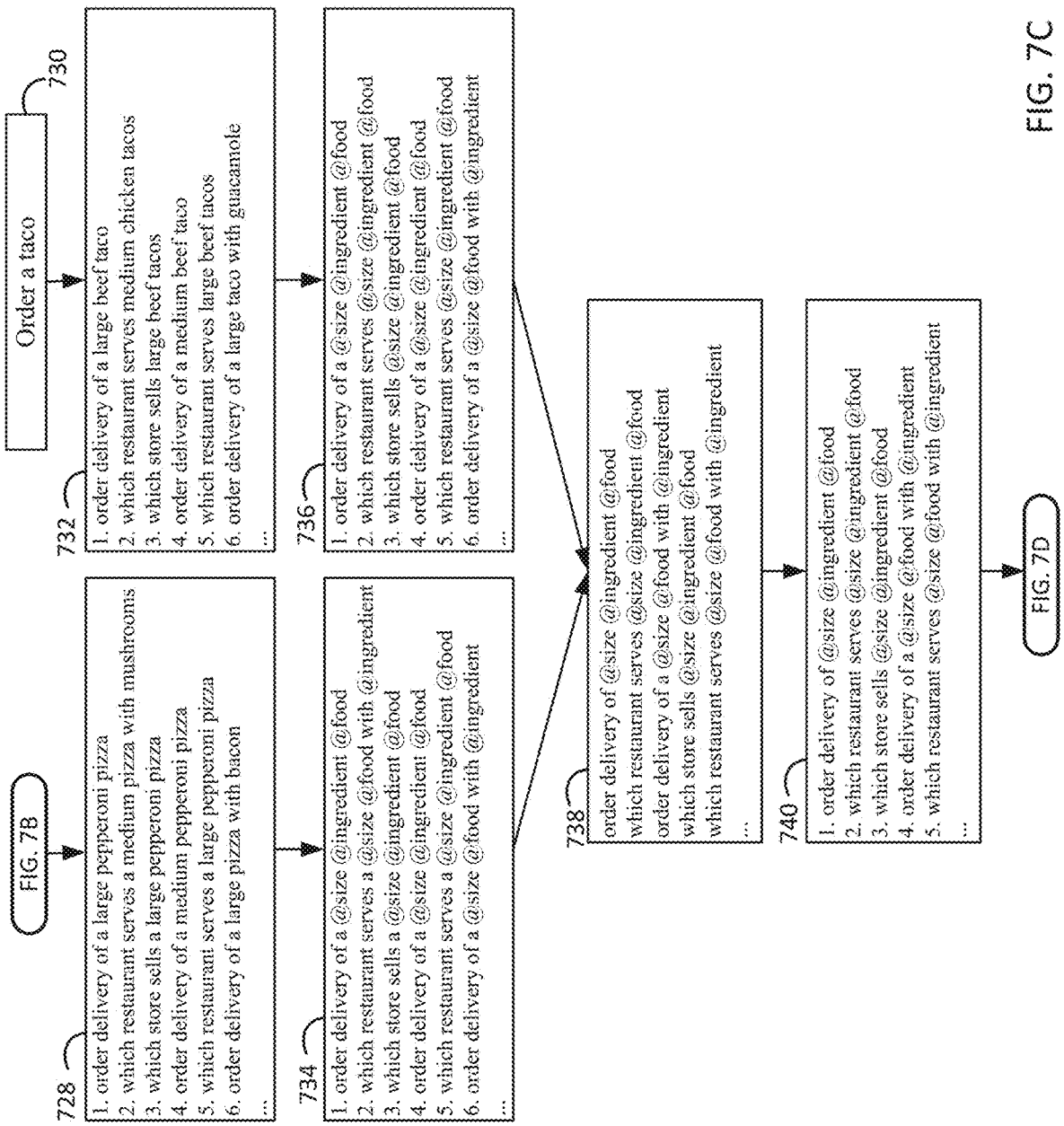

FIG. 7C

742 — order delivery of a large pepperoni pizza
order delivery of a large bacon pizza
order delivery of a medium pepperoni pizza
order delivery of a medium bacon pizza
order delivery of a small pepperoni pizza
order delivery of a small bacon pizza
order delivery of a large beef taco
order delivery of a large chicken taco
order delivery of a medium beef taco
order delivery of a medium chicken taco
order delivery of a small beef taco
order delivery of a small chicken taco
...

744 — order delivery of a large (@size) pepperoni (@ingredient) pizza (@food)
order delivery of a large (@size) bacon (@ingredient) pizza (@food)
order delivery of a medium (@size) pepperoni (@ingredient) pizza (@food)
order delivery of a medium (@size) bacon (@ingredient) pizza (@food)
order delivery of a small (@size) pepperoni (@ingredient) pizza (@food)
order delivery of a small (@size) bacon (@ingredient) pizza (@food)
order delivery of a large (@size) beef (@ingredient) taco (@food)
order delivery of a large (@size) chicken (@ingredient) taco (@food)
order delivery of a medium (@size) beef (@ingredient) taco (@food)
order delivery of a medium (@size) chicken (@ingredient) taco (@food)
order delivery of a small (@size) beef (@ingredient) taco (@food)
order delivery of a small (@size) chicken (@ingredient) taco(@food)
...

FIG. 7D

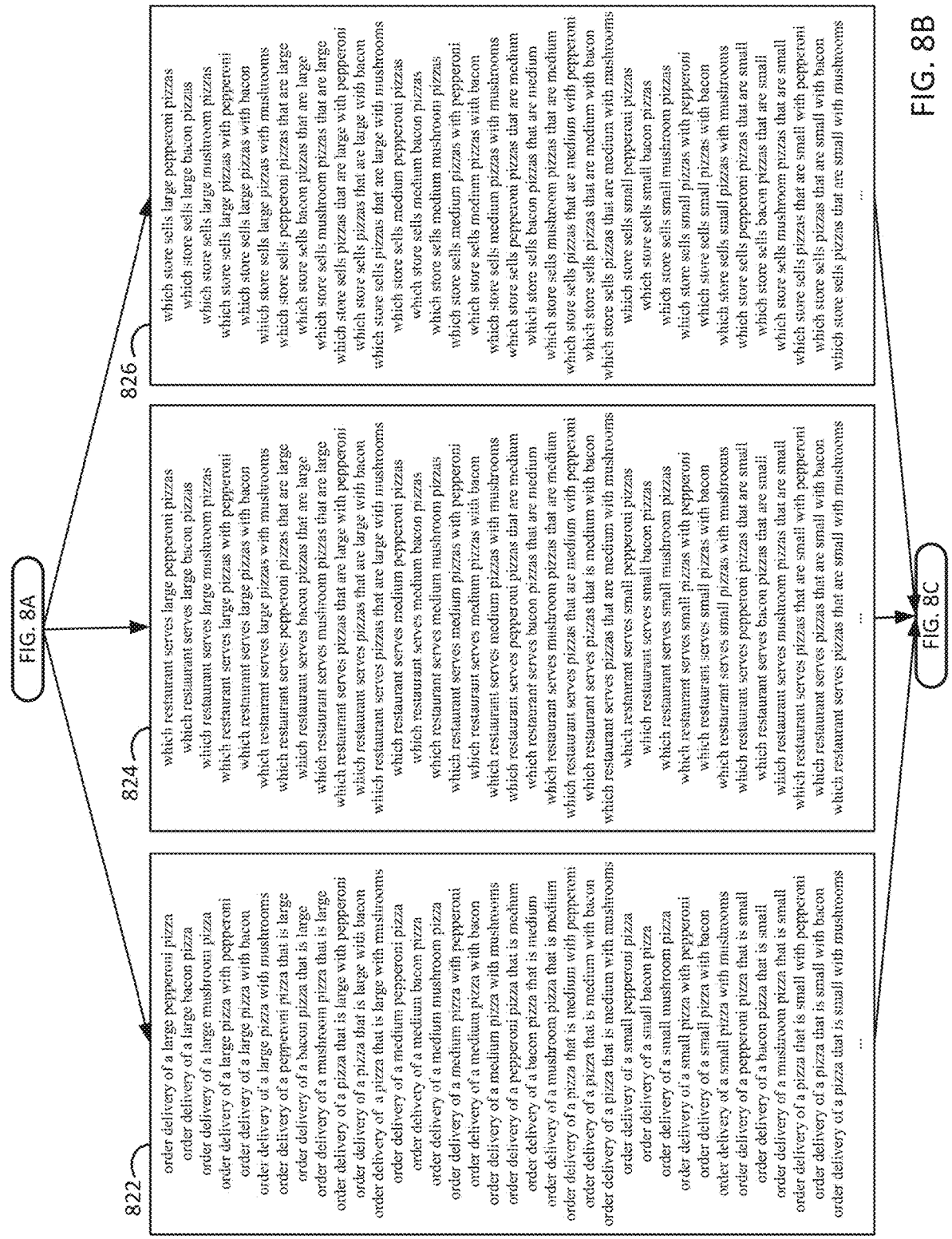

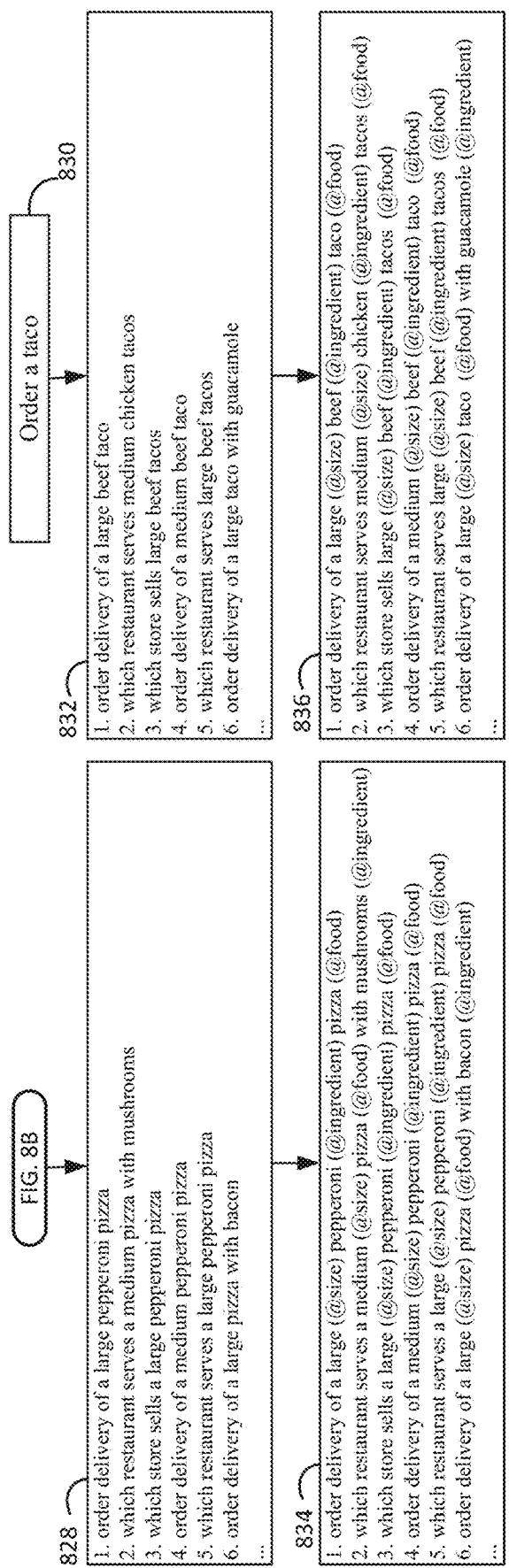

GENERATING ANNOTATED NATURAL LANGUAGE PHRASES

CROSS-REFERENCE TO RELATED APPLICATIONS

This application claims the benefit of U.S. Provisional Patent Application 62/674,397 titled "A System and Method for Automatic Iterative Utterance Generation," by Shen, et al., filed May 21, 2018, the entire contents of which is incorporated herein by reference.

TECHNICAL FIELD

An embodiment relates in general to generating natural language phrases, and more particularly, to generating annotated natural language phrases.

BACKGROUND

An electronic device, such as a smart phone or a laptop computer, can include a personal digital assistant that helps the device's user with different tasks, such as setting an alarm, receiving weather forecasts, or reviewing news updates. The personal digital assistant may use a natural language understanding ("NLU") engine to understand a phrase that is spoken or otherwise input by a user. A user can input different phrases, such as "order a pizza," "where can I buy tacos," or "deliver Korean food," that express the user's intent to find food. Therefore, a natural language understanding engine needs to understand the user's intent, such as find food, and the intent details, such as "pizza," "tacos," and "Korean food."

A training system may train a natural language understanding engine by using a large number of natural language phrases for each user intent and adding tags to words in natural language phrases, such as by tagging "pizza" and "taco" as "pizza (@food)" and "taco (@food)" tagging "large" as "large (@ size)," and tagging "Korean" as "Korean (@country)." If the training system can use natural language phrases, such as "order a pizza (@food)" and "order a taco (@food)," to sufficiently train a NLU engine to understand a type of phrase, then the NLU engine may be able to understand a subsequent phrase of the same type, such as understanding the phrase "order Korean food" as the intent to find food.

Training systems, however, typically rely on manual entries of the natural language phrases for each user intent and manual entries to add tags to the intent details. Such manual entries are very costly, and humans can provide only a limited number of natural language phrases and tags. For example, a software developer may enter phrases for ordering pizza, tacos, and Korean food, but forgets to enter a phrase for apples. Therefore, manually generated natural language phrases may not include many variations of natural language phrases. As a result, a NLU engine trained on limited manually generated natural language phrases can fail to understand a user's intent and/or the intent details.

A computer can generate natural language phrases. Human crowdsourcing can manually correct or delete computer-generated natural language phrases that are unnatural or grammatically incorrect and manually enter the tags in the computer-generated natural language phrases. While such human involvement can increase the quality of the naturalness and grammatical correctness of the computer-generated natural language phrases, these computer-generated natural language phrases can still fail to include many variations of the natural language phrases that express each intent. Moreover, the use of computer-generated natural language phrases is not scalable due to the large labor requirement for manually correcting or deleting computer-generated natural language phrases that are unnatural or grammatically incorrect and manually entering tags in the computer-generated natural language phrases.

SUMMARY

In one embodiment, a system generates annotated natural language phrases. The system receives a phrase that includes at least one tagged object and generates instantiated phrases by instantiations of each tagged object in the phrase. The system generates lists of natural language phrases by corresponding paraphrases of each of the instantiated phrases. The system generates ordered lists of natural language phrases by ordering natural language phrases in each list of natural language phrases based on occurrences of each natural language phrase. The system generates annotated natural language phrases by using each tagged object in the phrase to annotate the ordered lists of natural language phrases.

In another embodiment, a method generates annotated natural language phrases. A phrase that includes at least one tagged object is received, and instantiated phrases are generated by instantiations of each tagged object in the phrase. Lists of natural language phrases are generated by corresponding paraphrases of each of the instantiated phrases. Ordered lists of natural language phrases are generated by ordering natural language phrases in each list of natural language phrases based on occurrences of each natural language phrase. Annotated natural language phrases are generated by using each tagged object in the phrase to annotate the ordered lists of natural language phrases.

In yet another embodiment, a computer program product comprising computer-readable program code that includes instructions to generate annotated natural language phrases. The program code includes instructions to receive a phrase that includes at least one tagged object and generate instantiated phrases by instantiations of each tagged object in the phrase. The program code includes instructions to generate lists of natural language phrases by corresponding paraphrases of each of the instantiated phrases. The program code includes instructions to generate ordered lists of natural language phrases by ordering natural language phrases in each list of natural language phrases based on occurrences of each natural language phrase. The program code includes instructions to generate annotated natural language phrases by using each tagged object in the phrase to annotate the ordered lists of natural language phrases.

For example, a server receives a phrase "find @food," from a software developer, and generates instantiated phrases such as "find a pizza," "find a taco," and "find an apple." The server uses a paraphrase generator to generate: 1) a pizza list of natural language phrases ("order a pizza," "what restaurant serves pizzas," "which store sells pizzas," etc.); 2) a taco list of natural language phrases ("order a taco," "what restaurant serves tacos," "which store sells tacos," etc.); and 3) an apple list of natural language phrases ("order an apple," "what restaurant serves apples," "which store sells apples," etc.)

The server orders these lists based on how often these phrases occur in searches of a natural language model, thereby producing: 1) an ordered pizza list: i) "order a pizza," ii) "what restaurant serves pizzas," iii) "which store sells pizzas," etc.; 2) an ordered taco list: i) "what restaurant serves tacos," ii) "order a taco," iii) "which store sells tacos," etc.; and 3) an ordered apple list: i) "what store has a sale on apples," ii) "which store sells apples," iii) "order an apple," etc.

The server annotates the lists to produce: 1) an annotated pizza list: i) "order a pizza (@food)," ii) "what restaurant serves pizzas (@food)," iii) "which store sells pizzas (@food)," etc.; 2) an annotated taco list: i) "what restaurant serves tacos (@food)," ii) "order a taco (@food)," iii) "which store sells tacos (@food)," etc.; and 3) an annotated apple list: i) "what store has a sale on apples (@food)," ii) "which store sells apples (@food)," iii) "order an apple (@food)," etc.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which:

FIGS. 3A-B illustrate a block diagram of example generated phrases according to an embodiment;

FIGS. 5A-E illustrate yet another block diagram of example generated phrases according to an embodiment;

FIGS. 7A-D illustrate yet another additional block diagram of example generated phrases according to an embodiment;

FIGS. 8A-C illustrate a further block diagram of example generated phrases according to an embodiment;

DETAILED DESCRIPTION

Figure 1:
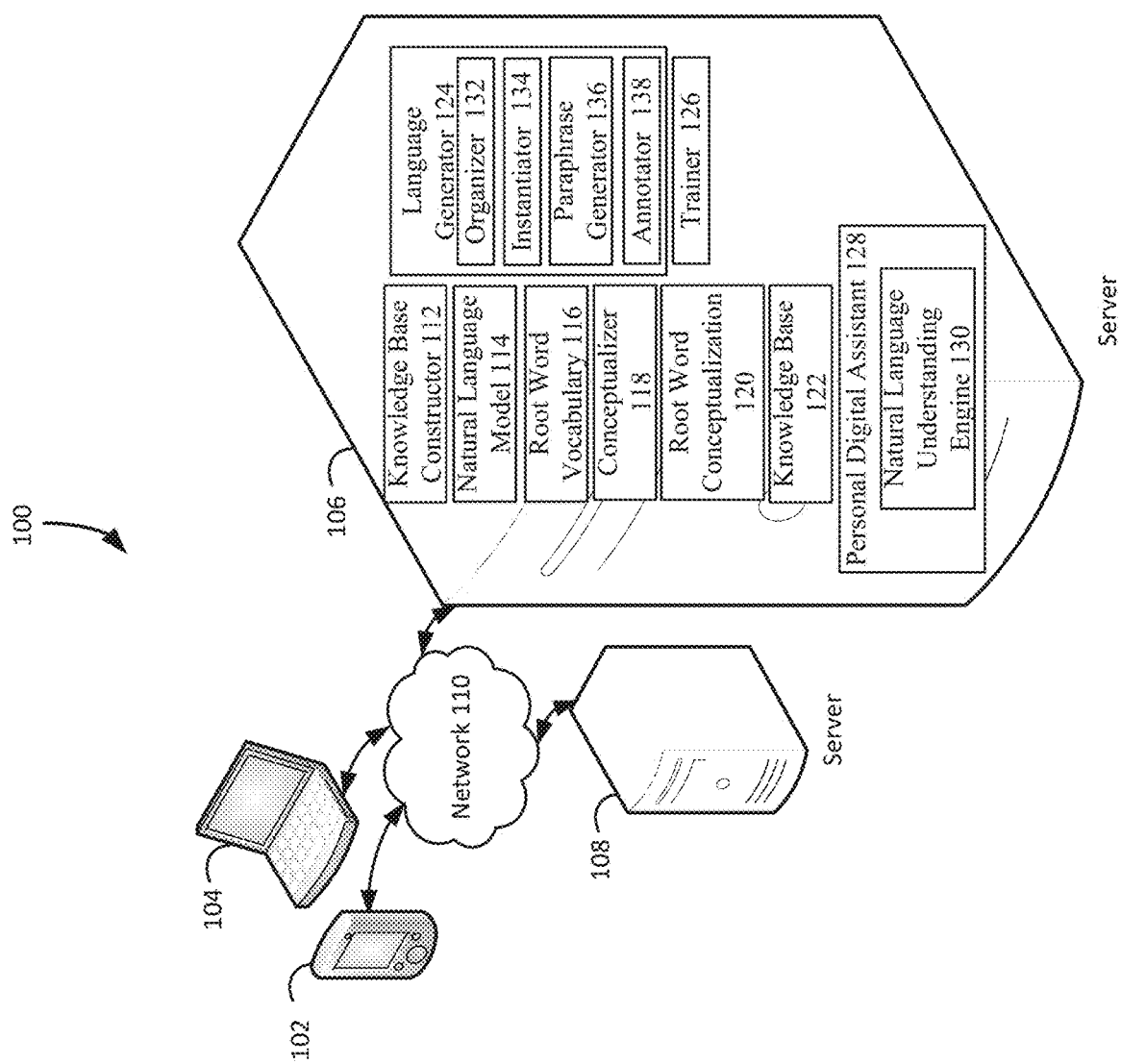
FIG. 1 illustrates a block diagram of an example system for generating annotated natural language phrases according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation, including meanings implied from the specification as well as meanings understood by those skilled in the art and/or defined in dictionaries, treatises, etc.

The term "phrase," or "utterance," generally refers to words that include a verb and at least one noun. The term "verb" is used to generally refer to a word used to describe an action, state, or occurrence. The term "object" is used to generally refer to a word or a group of words that represent a concept. The term "tag" generally refers to a label attached to a word or a group of words. The term "tagged object," or "placeholder," is used to generally refer to a word or a group of words that represent a concept and is attached to a label.

The term "attribute" is used to generally refer to a quality or feature regarded as a characteristic of something. The term "selection" is used to generally refer to the action of choosing something as being the best or most suitable. The term "instantiation" is used to generally refer to the creation of a particular realization of an abstraction or template, such as a class of objects. The term "instantiated phrase" is used to generally refer to a particular realization of an abstraction or template of words. The term "paraphrase" is used to generally refer to a rewording of something written or spoken by someone.

The term "list" is used to generally refer to a number of items written or printed consecutively. The term "ordered list" is used to generally refer to a number of items written or printed consecutively, which are arranged in an appropriate way. The term "merged list" is used to generally refer to a number of items written or printed consecutively, which have been combined to form a single entity. The term "occurrence" is used to generally refer to the frequency of something happening. The term "instance," or "filler word," is used to generally refer to an example of a concept.

The term "natural language phrase" is used to generally refer to a set of words conventionally used for human communication. The term "tagged natural language phrase" is used to generally refer to a set of words used for communication, in which one word has been replaced by a labelled word that is representative of the replaced word. The term "enhanced set" is used to generally refer to a number of things of the same kind that belong or are used together, and which have been collectively improved. The term "annotated natural language phrase" is used to generally refer to a set of words used for communication, to which an explanatory comment has been added. The term "natural language understanding engine" or "NLU" is used to generally refer to all systems and software that work together to analyze text, both written and spoken, derive meaning from data and respond to it adequately. The term "response" is used to generally refer to a reaction to something.

FIG. 1 illustrates a block diagram of a system 100 for generating annotated natural language phrases according to an embodiment. As shown in FIG. 1, the system 100 may illustrate a cloud computing environment in which data, applications, services, and other resources are stored and delivered through shared data-centers and appear as a single point of access for the end users. The system 100 may also represent any other type of distributed computer network environment in which servers control the storage and distribution of resources and services for different client users.

In an embodiment, the system 100 represents a cloud computing system that includes a first client 102, a second client 104, and a first server 106 and a second server 108 that may be provided by a hosting company. The clients 102-104 and the servers 106-108 communicate via a network 110. While FIG. 1 depicts the first client 102 as a smartphone 102 and the second client 104 as a laptop computer 104, each of the clients 102-104 may be any type of computer. The first server 106, which may be referred to a natural language server 106, includes components 112-138 in an embodiment. Although FIG. 1 depicts the system 100 with two clients 102-104, two servers 106-108, and one network 110, the system 100 may include any number of clients 102-104, any number of servers 106-108, and/or any number of networks 110. The clients 102-104 and the servers 106-108 may each be substantially similar to the system 1000 depicted in FIG. 10 and described below.

The system components 112-138, each of which may be combined into larger components and/or divided into smaller components, include a knowledge base constructor 112, a natural language model 114, a root word vocabulary 116, a conceptualizer 118, a root word conceptualizer 120, a knowledge base 122, a language generator 124, a trainer 126, a personal digital assistant 128, and a NLU engine 130. The language generator 124 may include an organizer 132, an instantiator 134, a paraphrase generator 136, and an annotator 138. FIG. 1 depicts the system components 112-138 residing completely on the natural language server 106, but the system components 112-138 may reside completely on the natural language server 106, completely on the second server 108, completely on the clients 102-104, or in any combination of partially on the servers 106-108, and partially on the clients 102-104. For example, after the natural language server 106 uses the components 112-138 for training the NLU engine 130 in the personal digital assistant 128, the natural language server 106 provides a copy of the personal digital assistant 128 for the smartphone 102.

The system can construct the knowledge base 122 to be the source of objects to be used to instantiate tagged objects in a phrase that is entered by a developer. The natural language server 106 can initiate construction of the knowledge base 122 in response to receiving a phrase. For example, the natural language server 106 receives the phrase "find @food" that was entered by a developer via the user interface of the laptop computer 104. After the natural language server 106 receives the phrase "find @food," the knowledge base constructor 112 extracts the tagged object "@food" from the phrase, and then uses the object "food" as the basis for constructing the knowledge base 122.

The knowledge base constructor 112 can receive vocabulary from the natural language model 114, identify root words in the vocabulary, and store the identified root words in the root word vocabulary 116. For example, the knowledge base constructor 112 receives the vocabulary words "pizza" and "pizzas" from the natural language model 114, identifies the root word "pizza" for the vocabulary words "pizza" and "pizzas," and stores the identified root word "pizza" in the root word vocabulary 116. The natural language model 114 model generally refers to a distribution function trained based on, for example online documents, that predicts the next word in a sentence, possibly given the previous word(s), and may be trained on a public corpus, such as Wikipedia®.

The knowledge base constructor 112 can then utilize the conceptualizer 118 to identify the lists of concepts for every root word in the root word vocabulary 116, where the concepts in the list are ranked by their order of probability, and subsequently store the lists of concepts in the root word conceptualization 120. For example, the knowledge base constructor 112 utilizes the conceptualizer 118 to identify the list of concepts: 1) "food," 2) "snack," 3) "item," and 4) "dish" for the root word "pizza" in the root word vocabulary 116, based on the highest probability that "pizza" is identified as the concept "food," the second highest probability that "pizza" is identified as the concept "snack," etc. Continuing the example, the knowledge base constructor 112 stores the list of concepts: 1) "food," 2) "snack," 3) "item," and 4) "dish" as associated objects for the root word "pizza" in in the root word conceptualization 120.

The knowledge base constructor 112 can construct the knowledge base 122 by identifying a concept in the root word conceptualization 120, identifying each root word that is associated with the concept in the root word conceptualization 120, and then storing these associations in the knowledge base 122. For example, the knowledge base constructor 112 identifies the concept "food" in the root word conceptualization 120, and identifies each root word in the root word conceptualization 120 that is associated with the concept "food," such as "pizza, "taco," "apple," etc. Continuing the example, the knowledge base constructor 112 stores the root words "pizza, "taco," "apple," etc. as instances of the concept "food" into the knowledge base 122.

In an embodiment, if the knowledge base constructor 112 is constructing the knowledge base 122 only for a specific tagged object, such as the tagged object "@food," that was extracted from the phrase "find @food," then the construction of the knowledge base 122 may be completed after storing a single concept and its instances. Alternatively, the knowledge base constructor 112 may continue constructing the knowledge base 122 by identifying another concept in the root word conceptualization 120, identifying each root word that is associated with the other concept in the root word conceptualization 120, and then storing these other associations in the knowledge base 122. For example, the knowledge base constructor 112 identifies the concept "size" in the root word conceptualization 120, and identifies each root word in the root word conceptualization 120 that is associated with the concept "size," such as "large, "medium," "small," etc. Continuing the example, the knowledge base constructor 112 stores the root words "small, "medium," "large," etc. as instances of the concept "size" into the knowledge base 122. The knowledge bases 122 may use a hash table to map a concept to instances of the concept, such as using a hash table to map the concept "food" to the instances "pizza, "taco," and "apple," of the concept "food."

In some embodiments, the knowledge base 122 has been constructed for a tagged object, the natural language server 106 can reuse the same knowledge base 122 for other phrases that include the same tagged object. For example, if the knowledge base 122 has been constructed for the tagged object "@food" in the phrase "find @food," then the natural language server 106 can reuse the same knowledge base 122 for the phrase "prepare @food." If the knowledge base 122 has been constructed for a combination of tagged objects, the natural language server 106 can reuse the same knowledge base 122 for other phrases that include some or all of the same combination of tagged objects. The knowledge base constructor 112 can construct the knowledge base 122 off-line, prior to receiving any tagged object, in anticipation of using lists of root words as instances of tagged objects.

In one embodiment, the knowledge base constructor 112 can identify relationships between concepts and store these relationships in the knowledge base 122 as object-attribute relationships. For example, the knowledge base constructor 112 determines that the concept "food" has attributes such as the concept "size" and the concept "ingredient." The knowledge base constructor 112 stores the concept "food" as an object tag in the knowledge base 122 and stores the concepts "size" and "ingredient" as attribute tags depending on the object tag "food" in the knowledge base 122. The natural language server 106 can use, as an example, the publicly available InfoBox template Q that includes such object-attribute pairs, to construct or provide aspects of the knowledge base 122.

The natural language server 106 can initiate generation of annotated natural language phrases after receiving a phrase that includes at least one tagged object. For example, the natural language server 106 receives the phrase "find @food" entered by a developer via a user interface of the laptop computer 104, as depicted by frame 200 of a user interface in FIG. 2.

Figure 2:
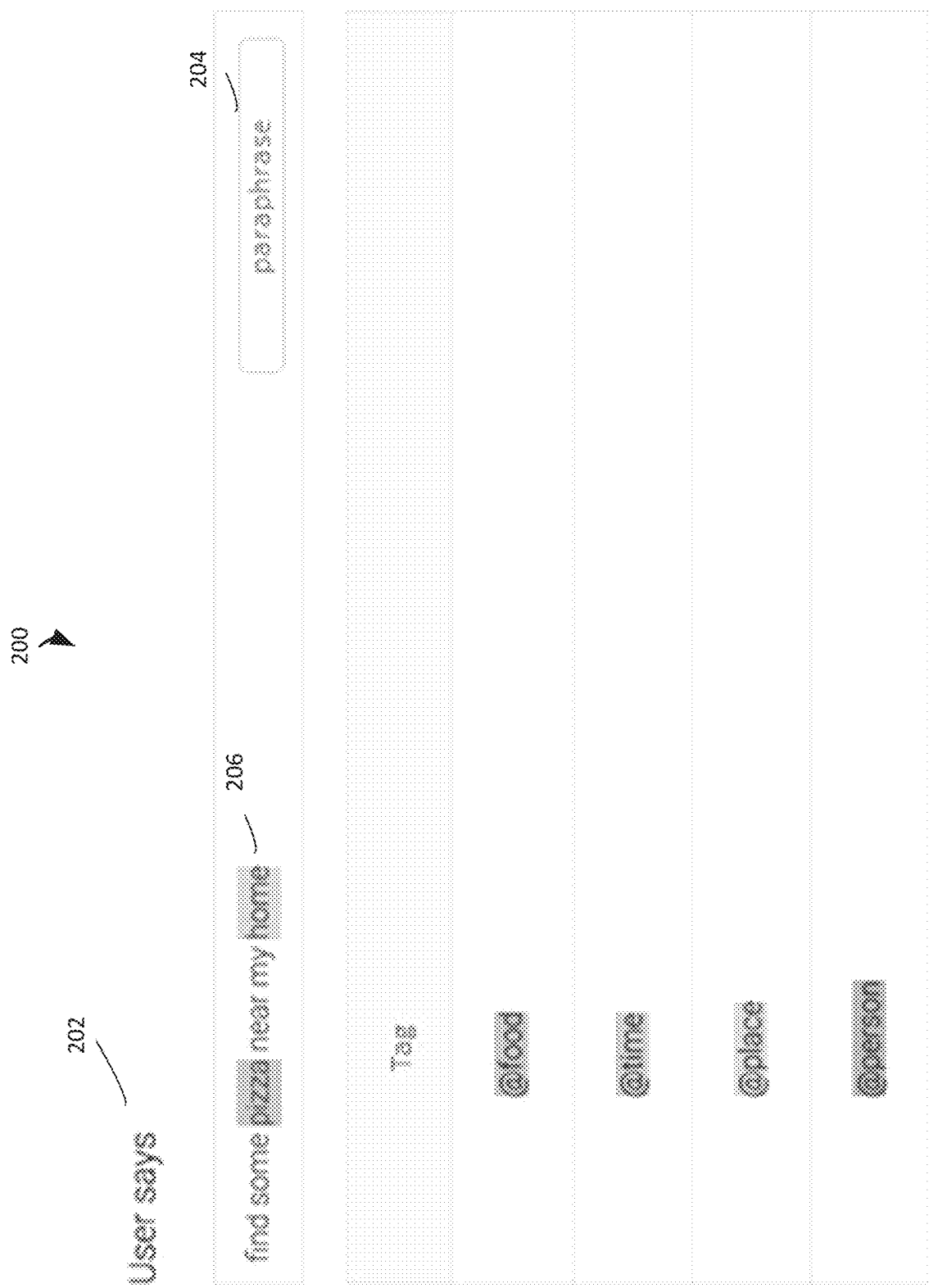
FIG. 2 illustrates a frame of an example user interface for generating annotated natural language phrases according to an embodiment.

FIG. 2 illustrates the frame 200 of an example user interface screen of a device for generating annotated natural language phrases according to an embodiment. The "user says" window 202 identifies where a developer can enter a phrase, such as "find food." The developer can enter the tagged phrase "find @food." Alternatively, the developer can enter the untagged phrase "find food." The natural language server 106 can recognize the concept "food" in the knowledge base 122 and then convert the untagged phrase "find food" into the tagged phrase "find @food." After the developer's entry has been accepted, the developer can select "paraphrase" 204 to generate annotated natural language phrases that are based on the phrase that the developer entered, such as "find some pizza near my home." 206

The natural language server 106 can generate natural language phrases that are incomplete sentences rather than generating natural language sentences because when interacting with the personal digital assistant 128, a person is more likely to input an incomplete sentence phrase such as "order a pizza" instead of inputting a sentence such as "I want to order a pizza." Furthermore, if the NLU engine 130 is sufficiently trained to understand an incomplete sentence phrase such as "order a pizza," then the NLU engine 130 is sufficiently trained to understand a sentence that includes the incomplete sentence phrase such as "I want to order a pizza." Due to these reasons, a developer can enter complete sentences or incomplete sentence phrases into the "user says" window 202.

The system enables the "cold start" generation of annotated natural language phrases. This capability is designed for a "cold start" developer who has no natural language expertise and a "cold start" dataset that lacks any or many natural language phrases. A developer can enter many different types of phrases into the "user says" window 202 to train the NLU engine 130 to understand many different phrase from a user. For example, a developer may enter "book @flight," "rent @car," "reserve @hotel," and "find @food," to generate annotated natural language phrases for training the NLU engine 130. Subsequently, the trained NLU engine 130 understands when a user requests to purchase two airline tickets to San Francisco, rent a car at the San Francisco airport, reserve a hotel room in downtown San Francisco, and reserve a table at a romantic restaurant that is not far from the hotel.

Alternatively, a third-party developer may enter a few related types of phrases into the "user says" window 202 to train the NLU engine 130 to understand a few types of phrases from a user. For example, a third-party developer of a third-party application for a pizza restaurant enters phrases to train the NLU engine 130 to understand when a person requests to order items from the pizza restaurant's menu for delivery or take-out.

The frame 200 may be part of a larger display screen that includes fields for users to enter commands to create, retrieve, edit, and store information. Because the frame 200 is a sample, the frame 200 could vary greatly in appearance. For example, the relative sizes and positioning of the graphical images are not important to the practice of the present disclosure. The frame 200 can be depicted by any visual display, but it is preferably depicted by a computer screen. The frame 200 could also be output as a report and printed or saved in an electronic format, such as PDF.

The frame 200 can be part of a personal computer system and/or a network, and operated from system data received by the network, and/or on the Internet. The frame 200 may be navigable by a user. Typically, a user can employ a touch screen input, voice command, or a mouse input device to point-and-click to locations on the frame 200 to manage the graphical images on the frame 200. Alternately, a user can employ directional indicators, or other input devices such as a keyboard. The graphical images depicted by the frame 200 are examples, as the frame 200 may include significantly greater amounts of graphical images. The frame 200 may also include fields in which a user can input information.

The generation of annotated natural language phrases begins by generating phrases based on one tagged object or multiple tagged objects. After the system generates ordered lists of natural language phrases, the system may be configured to annotate the ordered lists of natural language phrases. Alternatively, the system may be configured to continue by generating an enhanced set of natural language phrases that is based on the ordered lists of natural language phrases, and then annotate the enhanced set of natural language phrases.

The generation of natural language phrases based on one tagged object and the subsequent generation of the enhanced set of natural language phrases is described below with reference to FIGS. 3A-B. The generation of natural language phrases based one tagged object and the annotation of the ordered lists of such natural language phrases is described below with reference to FIGS. 4A-B. The generation of natural language phrases based on one tagged attribute and the subsequent generation of the enhanced set of such natural language phrases is described below with reference to FIGS. 5A-E. The generation of natural language phrases based on one tagged attribute and the annotation of the ordered lists of such natural language phrases is described below with reference to FIGS. 6A-B. The generation of natural language phrases based on multiple tagged attributes and the subsequent generation of the enhanced set of such natural language phrases is described below with reference to FIGS. 7A-D. And finally, the generation of natural language phrases based on multiple tagged attributes and the annotation of the ordered lists of such natural language phrases is described below with reference to FIGS. 8A-C.

Figure 3A:
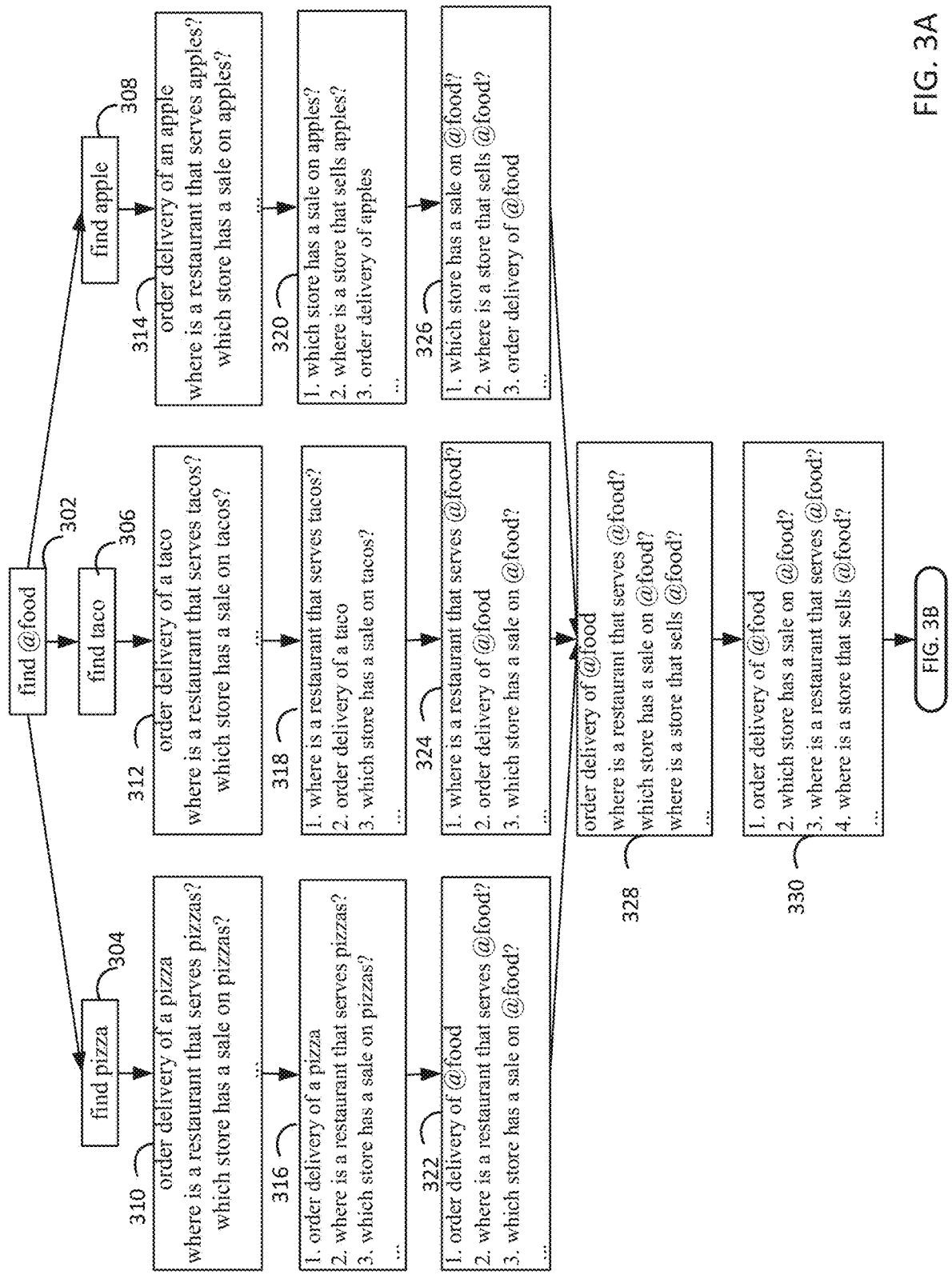

Generating natural language phrases, such as the natural language phrases depicted in FIGS. 3A-B, can begin by replacing at phrase including a single tagged object with natural language instances of the single tagged object. The system generates instantiated phrases by instantiations of each tagged object in the phrase. For example, the instantiator 134 identifies "food" in the phrase "find @food" 302 as a concept in the knowledge base 122, and then identifies instances of "food" in the knowledge database 122, including "pizza," "taco," and "apple." Continuing the example, the instantiator 134 uses these instances to instantiate the phrase "find @food" 302 to generate instantiated phrases, such as "find pizza" 304, "find taco" 306, and "find apple" 308.

FIG. 3A depicts only three instantiated phrases, "find pizza" 304, "find taco" 306, and "find apple" 308, for the purposes of simplifying the examples, but the instantiator 134 can generate any number of instantiated phrases. The instantiator 134 can limit the number of instances of the tagged object, such as using only the 30 most frequently identified instances of "food," which would consequently limit the number of instantiated phrases to the number of the instances of the tagged object, such as 30 instantiated phrases.

After replacing the tagged object with instances of the tagged object, the verb of the phrase is replaced with natural language paraphrases of the verb. Following the generation of the instantiated phrases, the system generates lists of natural language phrases by corresponding paraphrases of each of the instantiated phrases. For example, the paraphrase generator 136 paraphrases "find pizza" 304 as the list of natural language pizza phrases: "order delivery of a pizza," "where is a restaurant that serves pizzas," "what store has a sale on pizzas," . . . 310.

In another example, the paraphrase generator 136 paraphrases "find taco" 306 as the list of natural language taco phrases: "order delivery of a taco," "where is a restaurant that serves tacos," "what store has a sale on tacos," . . . 312. In yet another example, the paraphrase generator 136 paraphrases "find apple" 308 as the list of natural language apple phrases: "order delivery of an apple," "where is a restaurant that serves apples," "what store has a sale on apples," . . . 314. The paraphrase generator 136 can be implemented as an internal component of the language generator 124, or access an external source for paraphrasing, such as the paraphrase database (PPDB).

FIG. 3A depicts only three instantiated paraphrases, "order delivery of," "where is a restaurant that serves," and "what store has a sale on" of the word "find" for the purposes of simplifying the examples. The paraphrase generator 136, however, can generate any number of paraphrases. The paraphrase generator 136 can limit the number of paraphrases. For example, the paraphrase generator 136 can use only the 30 most common paraphrases of "find." This would consequently limit the number in each list of natural language phrases to 30 natural language phrases in each list of natural language phrases.

The occurrences of each natural language phrase are calculated so that a high ordering is assigned to frequently occurring natural language phrases and a low ordering is assigned to seldom occurring natural language phrases. The system generates ordered lists of natural language phrases by ordering natural language phrases in each list based on occurrences of each natural language phrase. For example, the organizer 132 orders the list of natural language pizza phrases 316 as: "1. order delivery of a pizza," "2. where is a restaurant that serves pizzas," "3. which store has a sale on pizzas," etc., based on how often these natural language phrases occur in the natural language model 114.

The occurrences of each natural language phrase in the natural language model 114 can be: 1) calculated as a simple count, such as 1.6 million results when searching the Internet for "order a pizza;" 2) calculated as a sequence of conditional probabilities; or 3) calculated by any other method that estimates the real-world usage of each natural language phrase. For example, the occurrences for "order a pizza" is calculated as the probability of the word "order" in the natural language model 114, multiplied by the probability of the word "a" given the word "order" in the natural language model 114, multiplied by the probability of the word "pizza" given the sequence of words "order a" in the natural language model 114. This calculation of conditional probabilities results in an estimation of how often the natural language phrase is actually used by each person who may be inputting phrases to their personal digital assistant 128. Phrases that have a high number of occurrences are more efficient for training the NLU engine 130 to understand subsequent natural language phrases input from a user, whereas phrases that have no occurrence or a low number of occurrences are less efficient.

For a generated natural language phrase $j=(x_1, x_2, \ldots, x_n)$ (for example, if the generated natural language phrase is "order a pizza", then $x_1$="order," $x_2$="a," $x_3$="pizza"), the occurrences of the phrase is calculated as follows:

$$p_j = \prod_{1 \le t \le n} Pr(x_t | x_1, x_2, \ldots, x_{t-1})$$

$Pr(x_t|x_1, x_2, \ldots, x_{t-1})$ is from the natural language model 114: the probability that the $t^{th}$ word is $x_t$ given the previous words $x_1, x_2, \ldots, x_{t-1}$.

In another example, the organizer 132 orders the list of natural language taco phrases 318 as "1. where is a restaurant that serves tacos," "2. order delivery of a taco," "3. which store has a sale on tacos," etc., based on the occurrence of each natural language phrase in the natural language model 114. In yet another example, the organizer 132 orders the list of natural language apple phrases 320 as "1. which store has a sale on apples," "2. where is a store that sells apples" "3. order delivery of an apple," etc., based on the occurrences of each natural language phrase in the natural language model 114.

The paraphrase "where is a restaurant that serves" is part of a phrase that is ordered as the second most frequently occurring phrase in the ordered list of natural language pizza phrases 316 and part of a phrase that is ordered as the most frequently occurring phrase in the ordered list of natural language taco phrases 318. This high ordering in the ordered lists 316 and 318 infers that the paraphrase "where is a restaurant that serves" is grammatically correct due to its high occurrences in the natural language model 114. The ordered list of natural language apple phrases 320 differs from the ordered lists 316 and 318, however, by not including the paraphrase "where is a restaurant that serves." The absence of this paraphrase in the ordered list of natural language apple phrases 320 does not infer that the phrase "where is a restaurant that serves apples" is grammatically incorrect, especially since the paraphrase was inferred to be grammatically correct by the other ordered lists 316 and 318. Rather, the absence of this paraphrase in the ordered list of natural language apple phrases 320 infers that the phrase "where is a restaurant that serves apples" is an unnatural phrase due to its infrequency. The natural language model 114 may not include any occurrences that combine the paraphrase "where is a restaurant that serves" with the instance "apples" because people do not search for restaurants that serve apples.

By ordering each natural language phrase based on how frequently it occurs in the natural language model 114, the organizer 132 orders unnatural or grammatically incorrect natural language phrases at the bottom of each list because unnatural or grammatically incorrect natural language phrases are not frequently occurring in the natural language model 114. If the organizer 132 deletes natural language phrases that are ordered lower than a threshold order value in the ordered lists, such as phrases below the $30^{th}$ most frequently occurring phrase in an ordered list, then the organizer 132 deletes any unnatural or grammatically incorrect natural language phrases that are not frequently occurring. Consequently, the organizer 132 eliminates any need for humans to manually review any natural language phrases and manually delete any unnatural or grammatically incorrect natural language phrases.

The organizer 132 enables the system to produce unexpected results by generating natural language phrases that are more natural and more grammatically correct than the natural language phrases that humans generate. If the system generated natural language phrases that were almost as natural and almost as grammatically correct as those generated by humans, these system-generated natural language phrase would be more efficiently generated due to the elimination of any need for humans to: 1) manually review any natural language phrases; 2) manually delete any unnatural or grammatically incorrect natural language phrases; or 3) manually annotate any natural language phrases. Experiments indicate, however, that the system-generated natural language phrases were more natural and more grammatically correct than those generated by humans. The experiment required groups of people to evaluate the naturalness and the grammatical correctness of system-generated natural language phrases and human-generated natural language phrases on a scale of 1 (unnatural or grammatically incorrect) to 5 (natural or grammatically correct). The results indicated that the system-generated natural language phrases were evaluated as 11% to 16% more natural than the human-generated natural language phrases, and 12% to 16% more grammatically correct than the human-generated natural language phrases.

For example, a human without natural language expertise may generate the phrase "where is a restaurant that serves apples," and a human reviewer without natural language expertise may approve the phrase because the reviewer may believe that such a phrase is natural and grammatically correct. Even if the system were to initially generate the phrase "where is a restaurant that serves apples," the organizer 132 orders phrases based on how often each phrase occurs in a natural language model 114. Even though "where is a restaurant that serves" is a frequently occurring paraphrase of the verb "find," and "apples" is a frequently occurring instance of the tagged object "@food," the phrase "where is a restaurant that serves apples" is not frequently occurring because such a combination is not natural, as people do not search for restaurants that serve apples. Therefore, the organizer 132 may determine that there are no occurrences of such an unnatural phrase, thereby resulting in a low ranking in an ordered list. This ensures that such an unnatural phrase is deleted and not in the natural language phrases that are subsequently annotated.

In another example, a human without natural language expertise may generate the phrase "order a pizza for the delivery," and a human reviewer without natural language expertise may approve the phrase because the reviewer may believe that such a phrase is natural and grammatically correct. Even if the system were to initially generate the phrase "order a pizza for the delivery," the organizer 132 orders phrases based on how often each phrase occurs in a natural language model 114. Therefore, the organizer 132 may determine that there are no occurrences of such a grammatically incorrect phrase, thereby resulting in a low ranking in an ordered list. This ensures that such a grammatically incorrect phrase is deleted and not in the natural language phrases that are subsequently annotated.

When a human reviewer makes the determination to delete or not delete a natural language phrase, the human reviewer bases this decision on his or her subjective personal opinion about the phrase's naturalness and grammatical correctness. In contrast, when the organizer 132 determines whether or not to delete a natural language phrase, the organizer 132 bases its decision on how often the phrase actually occurs in the natural language model 114, which is an objective evaluation that humans do not use in such a situation. Consequently, the review processes by human reviewers and the organizer 132 produce unexpectedly superior results, in which the system generates natural language phrases that are more natural and more grammatically correct than the human-generated natural language phrases.

As described above, although FIG. 3A depicts only the three most frequently occurring phrases for each ordered list for the purposes of simplifying the examples, each ordered list can include any number of most frequently occurring phrases. The organizer 132 can limit the number of most frequently occurring phrases, for example, to only the 30 most frequently occurring phrases in each list of natural language phrases.

At this point in the generation of natural language phrases, the ordered lists of natural language phrases can be annotated, or an enhanced set of natural language phrases can be generated based on the ordered lists, so that the enhanced set can be subsequently annotated. Annotating the ordered lists of natural language phrases is further described below in reference to FIG. 4A. FIGS. 3A-B depict the enhanced set of natural language phrases that are based on the ordered lists of natural language phrases, and the annotation of the enhanced set of natural language phrases.

Generating the enhanced set of natural language phrases can begin by replacing the instances of the single tagged object in the ordered lists with the single tagged object so that generalized versions of the natural language phrases can be merged from the different ordered lists. The system generates ordered lists of tagged natural language phrases by using each tagged object in the phrase to replace instances of each tagged object in the ordered lists of natural language phrases. For example, the instantiator 134 references instantiation records, determines that the tagged object "@food" was previously replaced with the instance "pizza," and uses the tagged object "@food" to replace each instance of "pizza" in the ordered list of natural language pizza phrases. These replacements create an ordered list of tagged natural language phrases 322: "1. order delivery of @food," "2. where is a restaurant that serves @food," "3. which store has a sale on @food," etc.

In another example, the instantiator 134 references instantiation records, determines that the tagged object "@food" was previously replaced with the instance "taco," and uses the tagged object "@food" to replace each instance of "taco" in the ordered list of natural language taco phrases. These replacements create an ordered list of tagged natural language phrases 324: "1. where is a restaurant that serves @food," "2. order delivery of @food," "3. which store has a sale on @food," etc. In yet another example, the instantiator 134 references instantiation records, determines that the tagged object "@food" was previously replaced with the instance "apple," and uses the tagged object "@food" to replace each instance of "apple" in the ordered list of natural language apple phrases. These replacements create an ordered list of tagged natural language phrases 326: "1. which store has a sale on @food," "2. where is a store that sells @food," "3. order delivery of @food," etc.

Although FIG. 3A depicts only three tagged natural language phrases for each ordered list for the purposes of simplifying the examples, each ordered list can include any number of tagged natural language phrases. If the organizer 132 limits the number of most frequently occurring phrases, such as using only the 30 most frequently occurring phrases in each list, then the number of tagged natural language phrases in each ordered list may be limited to the same number.

Once the ordered lists of natural language phrases are converted into tagged natural language phrases, some of these tagged natural language phrases that match are merged from the different ordered lists. The system generates a merged list of tagged natural language phrases by merging corresponding tagged natural language phrases that match each other. For example, the organizer 132 merges "1. order delivery of @food" from the ordered list 322 with "2. order delivery of @food" from the ordered list 324 and "3. order delivery of @food" from the ordered list 326 to produce the merged tagged natural language phrase "order delivery of @food."

In another example, the organizer 132 merges "2. where is a restaurant that serves @food" from the ordered list 322 with "1. where is a restaurant that serves @food" from the ordered list 324 to produce the merged tagged natural language phrase "where is a restaurant that serves @food."

In yet another example, the organizer 132 merges "3. which store has a sale on @food" from the ordered list 322 with "3. which store has a sale on @food" from the ordered list 324 and "1. what store has a sale on @food" from the ordered list 326, to produce the merged tagged natural language phrase "which store has a sale on @food."

The organizer 132 can use fuzzy matching to match tagged natural language phrases that are not exact matches, such as a fuzzy match between the tagged natural language phrases "what store has a sale on @food" and the tagged natural language phrases "what store has sales on @food." The resulting merged list of tagged natural language phrases 328 is "order delivery of @food," "where is a restaurant that serves @food," "which store has a sale on @food," "where is a store that sells @food." Although FIG. 3A depicts only four tagged natural language phrases in the merged list for the purposes of simplifying the examples, the merged list can include any number of tagged natural language phrases.

The tagged natural language phrases are ordered within the merged list of tagged natural language phrases based on how often their natural language phrases occur. The system generates an ordered list of tagged natural language phrases by ordering the merged list of tagged natural language phrases based on occurrences of each corresponding natural language phrase. For example, the organizer 132 counts 29 occurrences of "order delivery of a pizza," 13 occurrences of "order delivery of a taco," and 3 occurrences of "order delivery of an apple" in the natural language model 122, such that the total count is 45 for the merged phrase "order delivery of @food."

In another example, the organizer 132 counts 17 occurrences of "where is a restaurant that serves pizzas" and 23 occurrences of "where is a restaurant that serves tacos" in the natural language model 122, such that the total count is 40 for the merged phrase "where is a restaurant that serves @food."

In yet another example, the organizer 132 counts 7 occurrences of "which store has a sale on pizzas," 5 occurrences of "which store has a sale on tacos," and 19 occurrences of "which store has a sale on apples" in the natural language model 122, such that the total count is 33 for the merged phrase "which store has a sale on @food." In a further example, the organizer 132 counts 11 occurrences of "where is a store that sells apples" in the natural language model 122, such that the total count is 11 for the merged phrase "where is a store that sells @food."

The resulting ordered list of tagged natural language phrases 330 is "1. order delivery of @food" (based on a count of 45), "2. where is a restaurant that serves @food" (based on a count of 40), "3. which store has a sale on @food" (based on a count of 33), "4. where is a store that sells @food" (based on a count of 11), etc. Although the preceding examples based the ordering of tagged natural language phrases on integers that represent the occurrences of natural language phrases for the purposes of simplified examples, the occurrences of natural language phrases may be represented by any type of value, such as decimals and fractions.

For example, the ordering of each tagged natural language phrase may be based on a cumulative score from combining the occurrences of all its corresponding natural language phrases. For each tagged natural language phrase, the score is calculated as follows:

$$1 - \Pi_{1 \leq j \leq m}(1 - p_j)$$

where m is the number of natural language phrases corresponding to the same tagged natural language phrase and $p_j$ is the correctness probability of the natural language sentence j. Although FIG. 3A depicts only four tagged natural language phrases in the ordered list for the purposes of simplifying the examples, the ordered list can include any number of tagged natural language phrases.

The ordered list of tagged natural language phrases are instantiated to generate an enhanced set of natural language phrases that will be annotated. The system generates the enhanced set of natural language phrases by instantiations of each tagged object in the ordered list of tagged natural language phrases. For example, the instantiator 134 instantiates "1. order delivery of @food" in the list 330 as "order delivery of a pizza," "order delivery of a taco," and "order delivery of an apple."

In another example, the instantiator 134 instantiates "2. where is a restaurant that serves @food" in the list 330 as "where is a restaurant that serves pizzas," "where is a restaurant that serves tacos," and "where is a restaurant that serves apples."

In yet another example, the instantiator 134 instantiates "3. which store has a sale on @food" in the list 330 as "which store has a sale on pizzas," "which store has a sale on tacos," and "which store has a sale on apples." In a further example, the instantiator 134 instantiates "4. where is a store that sells @food" in the list 330 as "where is a store that sells pizzas," "where is a store that sells tacos," and "where is a store that sells apples." The resulting enhanced set of natural language phrases 332 is depicted in FIG. 3B. Although FIG. 3B depicts only twelve natural language phrases in the enhanced set for the purposes of simplifying the examples, the enhanced set can include any number of natural language phrases.

Alternatively, the system generates the annotated natural language phrases by inserting instances of each tagged object in the ordered list of tagged natural language phrases. For example, the instantiator 134 modifies "1. order delivery of @food" in the list 330 by referencing instantiation records, determining that the tagged object "@food" was previously replaced with the instance "pizza," and inserting the instance "pizza" before "@food" to create "order delivery of a pizza @food."

In another example, the instantiator 134 modifies "1. order delivery of @food" in the list 330 by referencing instantiation records, determining that the tagged object "@food" was previously replaced with the instance "taco,"

and by inserting the instance "taco" before "@food" to create "order delivery of a taco @food."

In yet another example, the instantiator 134 modifies "1. order delivery of @food" in the list 330 by referencing instantiation records, determining that the tagged object "@food" was previously replaced with the instance "apple," and by inserting the instance "apple" before "@food" to create "order delivery of an apple @food."

The enhanced set of natural language phrases is annotated for training the NLU engine 130. The system generates annotated natural language phrases by using each tagged object in the phrase to annotate the enhanced set of natural language phrases that is based on the ordered lists of natural language phrases.

In an embodiment, the annotator 138 references instantiation records, determines that the tagged object "@food" was previously replaced with the instance "pizza," and uses the tagged object "@food" to annotate "pizza" in the enhanced set of natural language phrases, thereby creating the annotated natural language phrase "order delivery of a pizza (@food)." Consequently, the annotator 138 eliminates any need for humans to manually review any natural language phrases and manually annotate any natural language phrases. The resulting annotated natural language phrases 334 is depicted in FIG. 3B. Although FIG. 3B depicts only twelve annotated natural language phrases in the enhanced set of natural language phrases for the purposes of simplifying the examples, the enhanced set of natural language phrases can include any number of annotated natural language phrases.

After annotation of the instances of each tagged object in the natural language phrases, the paraphrased verbs in the natural language phrases are optionally annotated with the verb that was paraphrased. Alternatively, a different process replaces the verb from the phrase with natural language paraphrases of the verb, which occurs at a different time. The system might use the verb in the phrase to annotate the enhanced set of natural language phrases that is based on the ordered lists of natural language phrases.

In one embodiment, the annotator 138 references paraphrasing records, determines that the verb "find" was previously replaced with the instance "order delivery of," and uses the tagged verb "@find" to annotate "order delivery of" in the enhanced set of natural language phrases, thereby creating the annotated natural language phrase "order delivery of (@find) a pizza (@food)." Consequently, the annotator 138 eliminates any need for humans to manually review any natural language phrases and manually annotate any natural language phrases. The resulting annotated natural language phrases 336 is depicted in FIG. 3B. Although FIG. 3B depicts only twelve annotated natural language phrases in the enhanced set of natural language phrases for the purposes of simplifying the examples, the enhanced set of natural language phrases can include any number of annotated natural language phrases.

While this example depicts embedding a tagged word, such as (@find), within an annotated natural language phrase, i.e., "order delivery of (@find) a pizza (@food)," the tagged words may be associated with words in the phrase by preceding the phrase, following the phrase, or any other type of association. This example uses textual underling to associate a tagged word, such as (@find), with a group of words within an annotated natural language phrase, "order delivery of (@find) a pizza (@food)," but the tagged words may be associated with words in the phrase by any other type of association. This example also uses the symbol "@" to tag an object, such as "@food," but the tagged objects may be tagged by any other type of symbol, special character, or font.

The annotated natural language phrases can be used to train the NLU engine 130. The system can use the annotated natural language phrases to train a NLU engine to understand a natural language phrase from a user, thereby enabling a response. For example, the trainer 126 uses the annotated natural language phrases 336 to train the NLU engine 130, and the natural language server 106 provides a copy of the personal digital assistant 128 to smartphone 102. Continuing the example, a person uses smartphone 102 and says the phrase "order delivery of a pizza." The NLU engine 130 understands the phrase, which helps the personal digital assistant 128 prompt the person for details, such as pizza size and toppings, the restaurant to make the pizza, and delivery time and location. The personal digital assistant 128 correctly completes the person's pizza delivery order because the trainer 126 used the annotated natural language phrases 336 to train the NLU engine 130.

Although this example describes communicating with a user via speaking, the user input may not be based on spoken language and the user input may be provided via any of multiple modalities, such as typed entry of text via a real or virtual keyboard, or similar substitutions, touch and mouse gestures, speech, and combinations of the above.

Figure 4A:
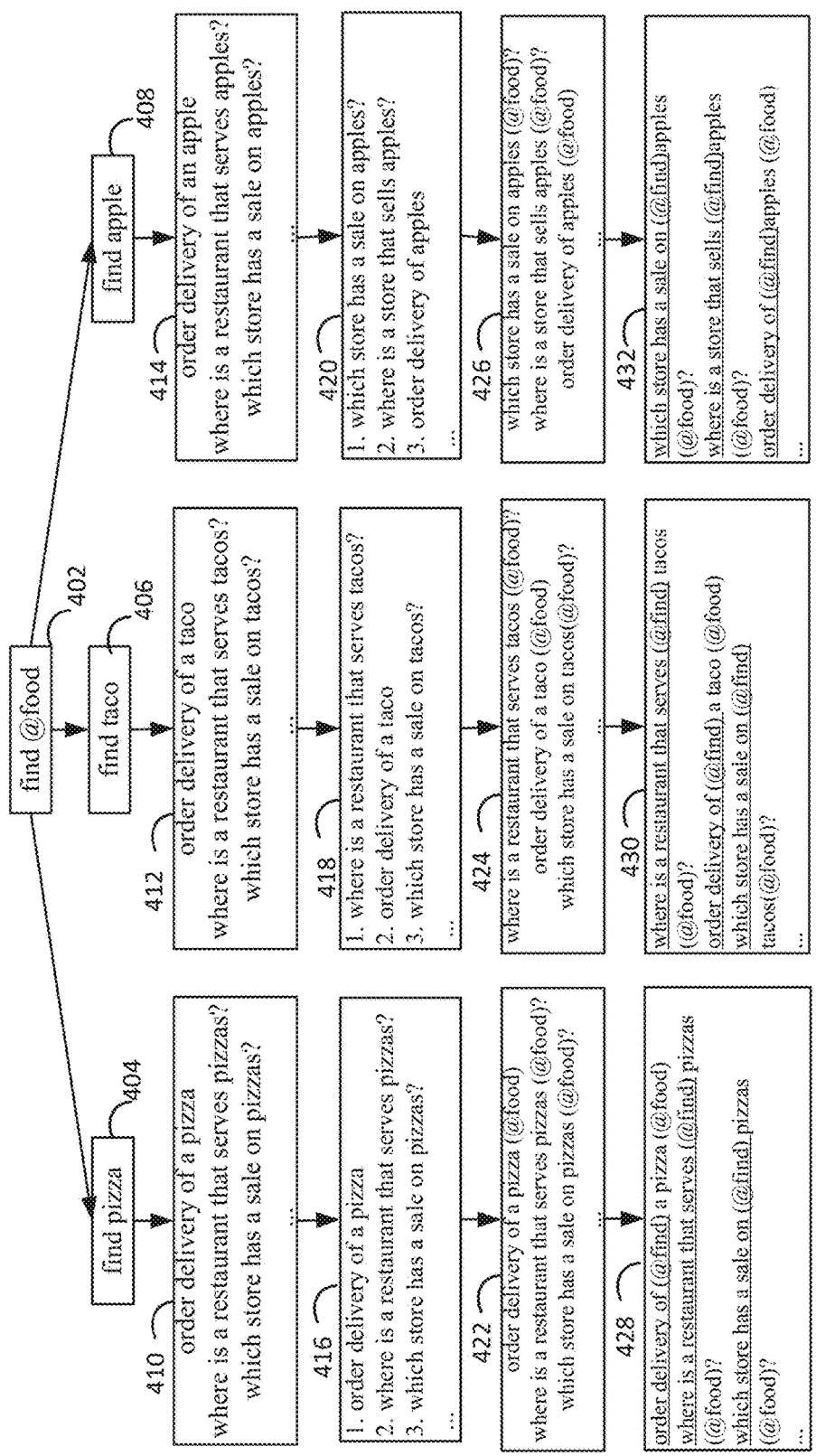
FIGS. 4A-B illustrate another block diagram of example generated phrases according to an embodiment.

FIGS. 3A-B depict an enhanced set of natural language phrases that is based on the ordered lists of natural language phrases, and the annotation of the enhanced set of natural language phrases. In contrast, FIG. 4A depicts the ordered lists of natural language phrases and the annotation of the ordered lists of natural language. Consequently, the phrases 402-426 depicted in FIG. 4A are similar to the phrases 302-326 depicted in FIG. 3A.

Figure 4B:
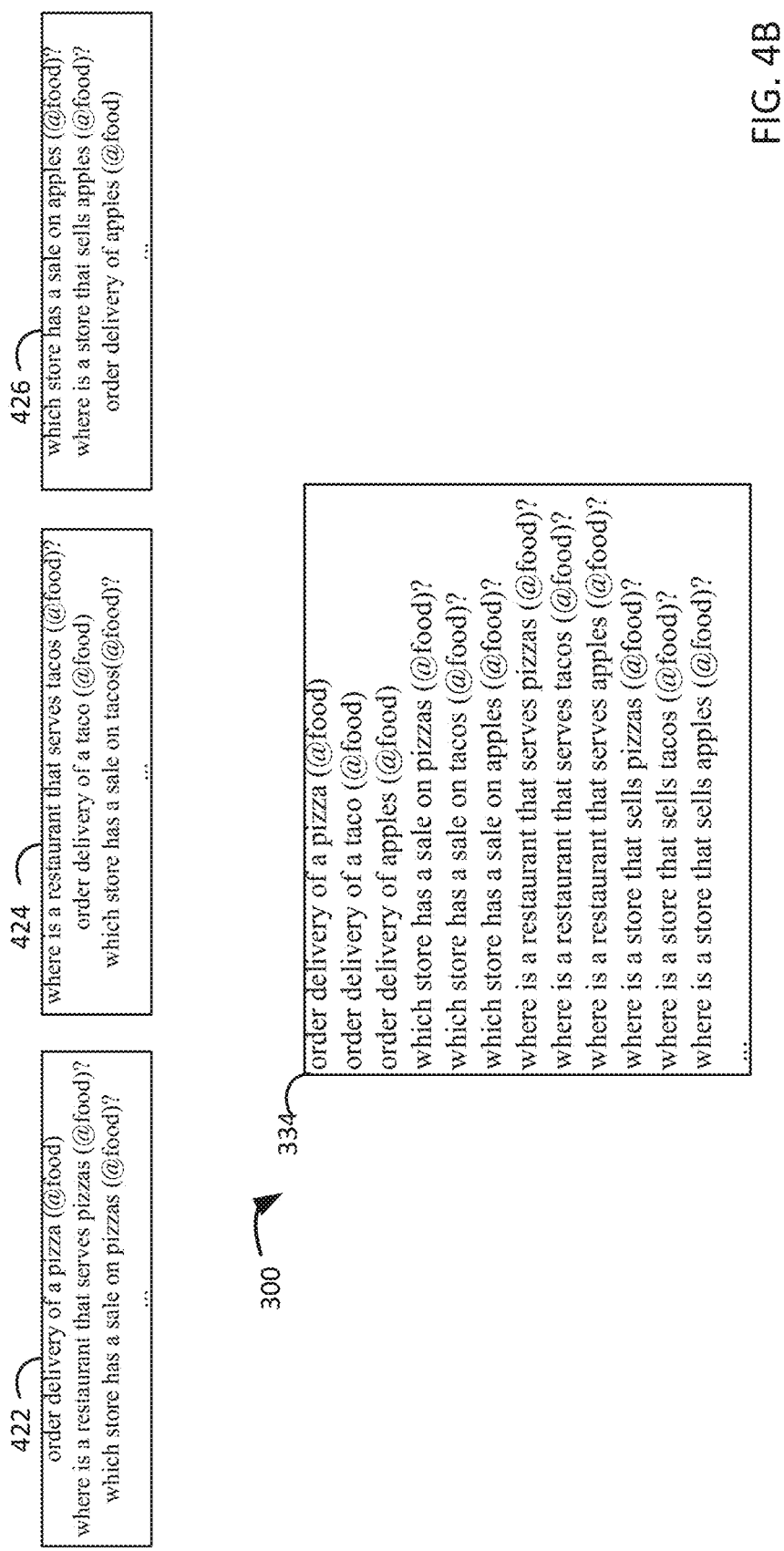

Generation of natural language phrases, such as the natural language phrases depicted in FIGS. 4A-B, can begin by replacing a single tagged object of a phrase with natural language instances of the single tagged object. The system generates instantiated phrases by instantiations of each tagged object in the phrase. For example, the instantiator 134 identifies "food" in the phrase "find @food" 402 as a concept in the knowledge base 122, and then identifies instances of "food" in the knowledge database 122, including "pizza," "taco," and "apple." Continuing the example, the instantiator 134 uses these instances to instantiate the phrase "find @food" 402 to generate instantiated phrases, such as "find pizza" 404, "find taco" 406, and "find apple" 408.

After generating the instantiated phrases, the system generates lists of natural language phrases by corresponding paraphrases of each of the instantiated phrases. For example, the paraphrase generator 136 paraphrases "find pizza" 404 as the list of natural language pizza phrases 410: "order delivery of a pizza," "where is a restaurant that serves pizzas," "which store has a sale on pizzas," etc.

In another example, the paraphrase generator 136 paraphrases "find taco" 406 as the list of natural language taco phrases 412: "order delivery of a taco," "where is a restaurant that serves tacos," "which store has a sale on tacos," etc.

In yet another example, the paraphrase generator 136 paraphrases "find apple" 408 as the list of natural language apple phrases 414: "order delivery of an apple," "where is a restaurant that serves apples," "which store has a sale on apples," etc.

The system generates ordered lists of natural language phrases by ordering natural language phrases in each list of natural language phrases based on occurrences of each natural language phrase. In one example, the organizer 132 orders the list of natural language pizza phrases 416 as: "1. order delivery of a pizza," "2. where is a restaurant that serves pizzas," "3. which store has a sale on pizzas," etc., based on how often these natural language phrases occur in the natural language model 114.

In another example, the organizer 132 orders the list of natural language taco phrases 418 as "1. where is a restaurant that serves tacos," "2. order delivery of a taco," "3. which store has a sale on tacos," etc., based on the occurrence of each natural language phrase in the natural language model 114.

In yet another example, the organizer 132 orders the list of natural language apple phrases 420 as "1. which store has a sale on apples," "2. where is a store that sells apples" "3. order delivery of an apple," etc., based on the occurrences of each natural language phrase in the natural language model 114.

At this point in the generation of natural language phrases, the ordered lists of natural language phrases can be annotated. Alternatively, an enhanced set of natural language phrases can be generated based on the ordered lists of natural language phrases so that the enhanced set of natural language phrases can be annotated. Generating an enhanced set of natural language phrases that is based on the ordered lists of natural language phrases and annotating the enhanced set of natural language phrases is described above in reference to FIGS. 3A-B. Annotating the ordered lists of natural language phrases is described directly below in reference to FIG. 4A.

The ordered lists of natural language phrases can be annotated for training the NLU engine 130. The system can generate annotated natural language phrases by using each tagged object in the phrase to annotate the ordered lists of natural language phrases. For example, the annotator 138 references instantiation records, determines that the tagged object "@food" was previously replaced with the instance "pizza," and uses the tagged object "@food" to annotate each instance of "pizza" in the ordered lists of natural language phrases. This results in the annotated natural language phrase "order delivery of a pizza (@food)." Consequently, the annotator 138 eliminates any need for humans to manually review any natural language phrases and manually annotate any natural language phrases. The resulting lists of annotated natural language phrases 422, 424, and 426 are depicted in FIG. 4A. Although FIG. 4A depicts only four annotated natural language phrases in each of three lists of annotated natural language phrases for the purposes of simplifying the examples, any number of lists of annotated natural language phrases can include any number of annotated natural language phrases.

After annotation of the instances of each tagged object in the natural language phrases, the paraphrased verbs in the natural language phrases are optionally annotated with the verb that was paraphrased. Alternatively, a different process replaces the phrase's verb with natural language paraphrases of the verb, which occurs at a different time. The system might use the verb in the phrase to annotate the ordered lists of natural language phrases. For example, the annotator 138 references paraphrasing records, determines that the verb "find" was previously replaced with the instance "order delivery of," and uses the tagged verb "@find" to annotate "order delivery of" in the ordered lists of natural language phrases. This results in the annotated natural language phrase "order delivery of (@find) a pizza (@food)." Consequently, the annotator 138 eliminates any need for humans to manually review any natural language phrases and manually annotate any natural language phrases. The resulting annotated natural language phrases 428, 430, and 432 are depicted in FIG. 4A. Although FIG. 4A depicts only four annotated natural language phrases in each of three lists of annotated natural language phrases for the purposes of simplifying the examples, any number of lists of annotated natural language phrases can include any number of annotated natural language phrases.

The annotated natural language phrases can be used to efficiently train the NLU engine 130. The system can use the annotated natural language phrases to train a NLU engine to understand a natural language phrase from a user, thereby enabling a response. For example, the trainer 126 uses the annotated natural language phrases 428-432 to train the NLU engine 130, and the natural language server 106 provides a copy of the personal digital assistant 128 to smartphone 102. Continuing the example, a person uses smartphone 102 and says the phrase "order delivery of a pizza," the NLU engine 130 understands the phrase, which helps the personal digital assistant 128 to prompt the person for details such as pizza size and toppings, the restaurant to make the pizza, and delivery time and location. The personal digital assistant 128 correctly completes the person's pizza delivery order because the trainer 126 used the annotated natural language phrases 428-432 to train the NLU engine 130.

FIG. 4B depicts a comparison of the annotated natural language phrases 422, 424, and 426 that are depicted in FIG. 4A and the annotated natural language phrases 334 that is depicted in FIG. 3B. Since the organizer 132 generated the annotated natural language phrases 334 based on merging the ordered lists 322, 324, and 326, and then ordering the merged list 328, the annotated natural language phrases 334 are an appropriately-weighted combination of the ordered lists 322, 324, and 326. For example, most of the ordered lists 322, 324, and 326 do not list "order delivery of" as the most frequently occurring paraphrase of the verb "find," but the annotated natural language phrases 334 lists "order delivery of" as the most frequently occurring paraphrase of the verb "find." Since "order delivery of" is the most frequently occurring paraphrase of the verb "find" for the phrase "find @food," the annotated natural language phrases 334 assigns the highest order to the paraphrase "order delivery of," which will result in efficiently training the NLU engine 130 on the most frequently occurring paraphrase of the verb "find." In contrast, most of the annotated natural language phrases 422, 424, and 426 that were generated from the ordered lists 416, 418, and 420, do not assign the highest order to the paraphrase "order delivery of." This will result in less efficiently training the NLU engine 130 on the most frequently occurring paraphrase of the verb "find."

Furthermore, since the lists of annotated natural language phrases 422, 424, and 426 indicate that the paraphrase "order delivery of" was infrequently combined with "an apple," training on the lists of annotated natural language phrases 422, 424, and 426 will not result in efficiently training the NLU engine 130 on the natural language phrase "order delivery of an apple." The NLU engine 130, however, is most efficiently trained on the most frequently occurring paraphrases of the phrase's verb and the most frequently occurring instances of the phrase's tagged object, even if a specific paraphrase of a verb was not frequently occurring in combination with a specific instance of a tagged object. For example, using "order delivery of an apple" to train the NLU engine 130 is efficient because such training enables the NLU engine 130 to understand the frequently occurring paraphrase "order delivery of," and separately understand the frequently occurring instance "apple." As a result, the NLU engine 130 can understand combinations of paraphrases and instances, even for infrequently occurring combinations. Therefore, using the annotated natural language phrases 334 instead of using the annotated natural language phrases 422, 424, and 426 is more efficient for training the NLU engine 130.

The expedited generation of phrases that annotate the ordered lists of natural language phrases to generate the annotated natural language phrases 422, 424, and 426 is a more efficient generation of phrases than the generation of enhanced phrases, which generates the enhanced set of natural language phrases based on the ordered lists of natural language phrases and then annotates the enhanced set of natural language phrases to generate the annotated natural language phrases 334. As indicated above, after the generation of the ordered lists of natural language phrases 416, 418, and 420, the expedited generation of phrases does not use any tagged object to replace any instance of a tagged object to generate lists of tagged natural language phrases, and also does not merge any tagged natural language phrases to generate any merged list of tagged natural language phrases.

Furthermore, the expedited generation of phrases does not order any merged list of tagged natural language phrases to generate any ordered list of tagged natural language phrases, and also does not use instances of any tagged object to instantiate any ordered list of tagged natural language phrases to generate any enhanced set of natural language phrases. Consequently, the expedited generation of annotated natural language phrases is a more efficient generation of phrases than the generation of annotated natural language phrases based on generating an enhanced set of natural language phrases. As described above, however, training the NLU engine 130 is more efficient using the generation of annotated natural language phrases 334 based on generating an enhanced set of natural language phrases than using the expedited generation of annotated natural language phrases 422, 424, and 426.

The generation of annotated natural language phrases may be based on one tagged object or multiple tagged objects, and the generation of annotated natural language phrases may be based on an expedited generation of phrases or a generation of enhanced phrases. The generation of enhanced phrases that is based on one tagged object is described above with reference to FIGS. 3A-B. The expedited generation of phrases that is based on one tagged object is also described above with reference to FIGS. 4A-B. The generation of enhanced phrases based on one tagged attribute is described below with reference to FIG. 5A-E. The expedited generation of phrases based on one tagged attribute is further described below with reference to FIGS. 6A-B.

The phrases 502-536 depicted in FIGS. 5A-E are similar to the phrases 302-336 depicted in FIGS. 3A-B, except that the phrases 502-536 are based on multiple tagged objects while the phrases 302-336 are based on a single tagged object. The natural language server 106 initiates generation of annotated natural language phrases after receiving a phrase that includes at least one tagged object. For example, the natural language server 106 receives the phrase "find @food" 501 that was entered by a developer via the user interface of the laptop computer 104.

Instead of beginning the generation of natural language phrases based on the single tagged object that was entered by the developer, the system can identify an object as attribute of any tagged object in the phrase. In an embodiment, the instantiator 134 extracts the tagged object "@food" from the phrase "find @food" 501, determines that "food" is an object or concept in the knowledge base 122, and then determines that the knowledge base 122 identifies the object or concept "size" as an attribute for the object or concept "food."

Having identified an object as an attribute of a tagged object, the system can insert the object as a tagged object into the phrase. In one embodiment, the instantiator 134 inserts the object "size" as the additional tagged object "@size" into the phrase "find @food" 501 to create the first permutation of the expanded phrase "find @size @food" 502 and the second permutation of the expanded phrase "find @food @size." For purposes of simplifying the examples, this embodiment is not depicted in FIG. 5A. The instantiator 134 creates two permutations by inserting the additional tagged object before and after the tagged object in the phrase.

In a more complex example, the instantiator 134 determines that the knowledge base 122 identifies the objects "size," "ingredient," "supplier," "delivery time," and "delivery location" as attributes for the object "food." The instantiator 134 then inserts the objects "size," "ingredient," "supplier," "delivery time," and "delivery location" as the additional tagged objects "@ size," "@ingredient," "@supplier," "@delivery time," and "@delivery location" into the phrase "find @food" 501 to create 720 permutations of the expanded phrase "find @food @size @ ingredient @ supplier @ delivery time @ delivery location."

A developer may not want to generate natural language phrases based on such a large number of attributes being inserted into the expanded phrase, due to the developer's belief that people may be more likely to initially specify less than all of the possible attributes. For example, most people may be more likely to say "order delivery of a pizza," and be prompted for the pizza's size, toppings, and delivery details, than they would be likely to say "order delivery of a large pepperoni pizza from a nearby PizzaMax to my home at 6:00 PM." Therefore, the system can output the objects that are identified as attributes of the tagged object, receive a selection of at least one of the identified objects, and then insert any selected objects as additional tagged objects into the phrase. For example, the instantiator 134 informs the developer that the knowledge base 122 identifies the objects "size," "ingredient," "supplier," "delivery time," and "delivery location" as attributes for the object "food," receives the developer's selection of the object "size," and then inserts the object "size" as the additional tagged object "@ size" into the phrase "find @food" 501 to create the first permutation of the expanded phrase "find @size @food" 502 and the second permutation of the expanded phrase "find @food @size."

When multiple identified objects are selected, the number of permutations may be relatively large, and not every permutation may result in a natural language phrase that is natural. For example, if a developer selected the attributes "size" and "ingredient" for the tagged object "@food," then the number of permutations is six: 1) "find @food @size @ingredient," 2) "find @food @ingredient @size," 3) "find @size @food @ingredient," 4) "find @ingredient @food @size," 5) "find @size @ingredient @food," and 6) "find @ingredient @size @food."

If a selection of multiple identified objects is received, the system can output permutations of the tagged object based on each individual selected object. For example, the instantiator 134 receives the developer's selection of the object "size" and the object "ingredient," outputs the first permutation of the expanded phrase "find @size @food" 502, the second permutation of the expanded phrase "find @food @size," the third permutation of the expanded phrase "find @ingredient @food," and the fourth permutation of the expanded phrase "find @food @ingredient." Each of these permutations include only a single attribute, and not all of the selected attributes.

After outputting permutations of the tagged object based on each individual selected object, the system can receive any selected permutations based on each individual selected object. For example, the instantiator 134 receives the developer's selection of the first permutation of the expanded phrase "find @size @food" 502, the third permutation of the expanded phrase "find @ingredient @food," and the fourth permutation of the expanded phrase "find @food @ingredient." In this example, the developer did not select the second permutation of the expanded phrase "find @food @size" because the developer believes that such a permutation would result in generating phrases that are not natural, such as "order delivery of a pizza that is large," instead of the more natural phrase "order delivery of a large pizza."

If a selection of multiple permutations is received, the system can output combined attribute permutations bases on each selected individual attribute permutation. For example, the instantiator 134 receives the developer's selection of the individual attribute permutations "find @size @food" 502, "find @ingredient @food," and "find @food @ingredient," and outputs the first combined attribute permutation "find @size @ingredient @food," the second combined attribute permutation "find @ingredient @size @food," and the third combined attribute permutation "find @size @food @ingredient."

After outputting combined attribute permutations, the system can receive any selected combined attribute permutations. For example, the instantiator 134 receives the developer's selection of the first combined attribute permutation "find @size @ingredient @food," and the third combined attribute permutation "find @ size @ food @ ingredient." In this example, the developer did not select the second combined attribute permutation "find @ ingredient @ size @food," because the developer believes that such a permutation would result in generating phrases that are not natural, such as "order delivery of a pepperoni large pizza," instead of the more natural phrases "order delivery of a large pepperoni pizza," and "order delivery of a large pizza with pepperoni."

Although this example described an iterative permutation process that combined selected permutations for two selected attributes, the iterative permutation process can continue iterating to combine selected permutations for any number of selected attributes. For example, the developer may select the attributes "size," "ingredient," and "supplier," for the tagged object "@food," and the instantiator 134 receives the developer's selection of the previously combined attribute permutations "find @size @ingredient @food" and "find @size @food @ingredient, and also receives the developer's selection of the permutation "find @food @supplier." The instantiator 134 then outputs the first new combined attribute permutation "find @size @ingredient @food @supplier," the second new combined attribute permutation "find @size @food @ingredient @supplier," and the third new combined attribute permutation "find @size @food @supplier @ingredient." After receiving the developer's selection of new combined attribute permutations, instantiator 134 iteratively repeats the process of generating combined attribute permutations until all of the developer's selected attributes have been inserted into the expanded phrase.

In addition to selecting to eliminate identified objects from being inserted as additional tagged objects into the phrase, the developer has the option to select any supplemental objects, which the instantiator 134 did not identify as an attribute of a tagged object in the phrase, to be inserted as supplemental tagged objects into the phrase. Furthermore, the developer can select to withhold any instance of a tagged object from instantiating the tagged object, and also select to add a supplemental instance to be used to instantiate a tagged object.

A developer may have other reasons to select which attributes of a tagged object are inserted into the phrase. For example, if the instantiator 134 informs the developer that the knowledge base 122 identifies the objects "size," "ingredient," "supplier," "delivery time," "delivery location," "reservation location," "reservation time," and "number of people for the reservation," as attributes for the object "food," the developer may realize that delivery attributes are incompatible with reservation attributes. Therefore, the developer may select either the delivery attributes or the reservation attributes for expanding the phrase.

The developer can also enter a phrase that includes multiple tagged objects. For example, the natural language server 106 receives the phrase "find @size @food" 502 that was entered by a developer via the user interface of the laptop computer 104. Although the generated phrases 504-536 are based on a phrase that includes two tagged objects for simplification purposes, the system can generate the phrases 504-536 based on a phrase that includes any number of tagged objects.

Generating natural language phrases, such as the natural language phrases depicted in FIGS. 5 A-E, can begin by replacing a phrase's multiple tagged objects with natural language instances of the multiple tagged objects. The system generates instantiated phrases by instantiations of each tagged object in the phrase.

In one embodiment, the instantiator 134 identifies "size" and "food" in the phrase "find @size @food" 502 as concepts in the knowledge base 122, and then identifies instances of "size" and instances of "food" in the knowledge database 122, including "large," "medium," "small," "pizza," "taco," and "apple." Continuing the example, the instantiator 134 uses these instances to instantiate the phrase "find @size @food" 502 to generate instantiated phrases, such as "find large pizza," "find medium pizza," "find small pizza" 504, "find large taco," "find medium taco," "find small taco" 506, and "find large apple," "find medium apple," "find small apple" 508.

In an embodiment, the instantiator 134 uses these instances to instantiate the phrase "find @food @size" to generate instantiated phrases, such as "find pizza large," "find pizza medium," "find pizza small", "find taco large," "find taco medium," "find taco small", "find apple large," "find apple medium," and "find apple small." In a multiple attribute example, the instantiator 134 uses instances of "size" and "ingredient" to instantiate the phrases "find @ size @food @ingredient" and "find @size @ingredient @food" to generate instantiated phrases, such as "find large pepperoni pizza," "find medium bacon pizza," "find small pepperoni pizza," "find large pizza with bacon," "find medium pizza with pepperoni," and "find small pizza with bacon."

If multiple tagged objects share the same instances, the instantiator 134 does not use these shared instances to instantiate any of these tagged objects. For example, if the phrase is "find @food @ ingredient," and the instantiator 134 identifies "sausage" as a frequently occurring instance of the object "food" and "sausage" as a frequently occurring instance of the object "ingredient" (for the food "pizza"), then the instantiator 134 does not use the instance "sausage" to instantiate the tagged object "@food" or the tagged object "@ingredient." Although the instance "sausage" will not be used to generate the annotated natural language phrases used to train the NLU engine 130, after the NLU engine 130 is sufficiently trained, the NLU engine 130 will be able to access the vocabulary word "sausage," and therefore be able to understand users saying "order delivery of a smoked sausage" and "order delivery of a pizza with pepperoni and sausage."

Figure 5A:
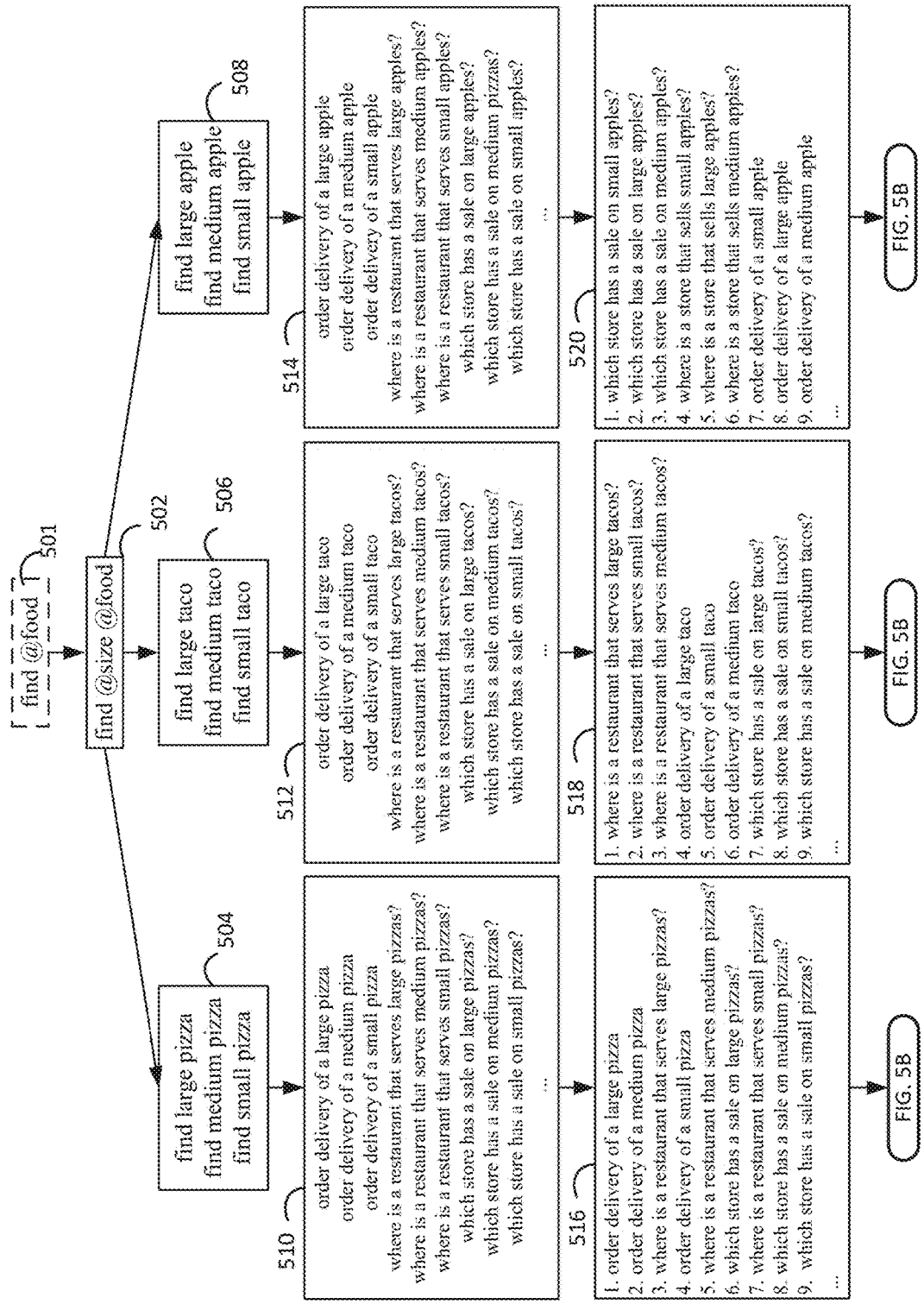

FIG. 5A depicts only nine instantiated phrases, "find large pizza," "find medium pizza," "find small pizza" 504, "find large taco," "find medium taco," "find small taco" 506, and "find large apple," "find medium apple," "find small apple" 508 for the purposes of simplifying the examples, but the instantiator 134 can generate any number of instantiated phrases. The instantiator 134 can limit the number of instances, such as using only the 30 most frequently identified instances of "ingredients" and the 30 most frequently identified instances of "food," which would consequently limit the number of instantiated phrases to the number of the combinations of these instances, such as 900 instantiated phrases.

After replacing the phrase's multiple tagged object with instances of the multiple tagged objects, the phrase's verb can be replaced with natural language paraphrases of the verb. Following the generation of the instantiated phrases, the system generates lists of natural language phrases by corresponding paraphrases of each of the instantiated phrases.

For example, the paraphrase generator 136 paraphrases "find large pizza," "find medium pizza," "find small pizza" 504," as the list of natural language pizza phrases 510: "order delivery of a large pizza," "order delivery of a medium pizza," "order delivery of a small pizza," "where is a restaurant that serves large pizzas," "where is a restaurant that serves medium pizzas," "where is a restaurant that serves small pizzas," etc.

In another example, the paraphrase generator 136 paraphrases "find pizza large," "find pizza medium," "find pizza small," as the list of natural language pizza phrases, which includes "order delivery of a pizza that is large," "order delivery of a pizza that is medium," "order delivery of a pizza that is small" through the use of the joiner words "that is" between the food and the size. The paraphrase generator 136 can use other joiner words to grammatically connect instances of tagged objects, such as "order delivery of a large pizza with pepperoni" and "order delivery of a spicy taco, hold the jalapenos."

In other examples, the paraphrase generator 136 paraphrases "find large taco," "find medium taco," "find small taco" 506 as the list of natural language taco phrases 512, and paraphrases "find large apple," "find medium apple," "find small apple" 508 as the list of natural language apple phrases 514. In a multiple attribute example, the paraphrase generator 136 paraphrases "find large pepperoni pizza" as "order delivery of a large pepperoni pizza," "where is a restaurant that serves large pepperoni pizzas," "which store has a sale on large pepperoni pizzas," etc.

FIG. 5A depicts only three instantiated paraphrases, "order delivery of," "where is a restaurant that serves," and "which store has a sale on" as paraphrases of the word "find" for the purposes of simplifying the examples. The paraphrase generator 136, however, can generate any number of paraphrases. The paraphrase generator 136 can limit the number of paraphrases, such as using only the 30 most common paraphrases of "find." This would consequently limit the number in each list of natural language phrases to the number of paraphrases, i.e., 30 natural language phrases.

The occurrences of each natural language phrase are calculated so that a high ordering is assigned to frequently occurring natural language phrases and a low ordering is assigned to seldom occurring natural language phrases. The system generates ordered lists of natural language phrases by ordering natural language phrases in each list of natural language phrases based on occurrences of each natural language phrase. For example, the organizer 132 orders the list of natural language pizza phrases 516 as: "1. order delivery of a large pizza," "2. order delivery of a medium pizza," "3. where is a restaurant that serves large pizzas," "4. order delivery of a small pizza," "5. where is a restaurant that serves medium pizzas," "6. which store has a sale on large pizzas," etc., based on how often these natural language phrases occur in the natural language model 114. In other examples, the organizer 132 orders the list of natural language taco phrases 518 and the list of natural language apple phrases 520 based on the occurrence of each natural language phrase in the natural language model 114. Similarly, the organizer 132 could order a list of multiple attribute pizza phrases based on the occurrence of each natural language phrase in the natural language model 114.

The paraphrases of the first permutation of the expanded phrase "find @ size @ food" result in frequently occurring natural language phrases, such as "1. order delivery of a large pizza," "2. order delivery of a medium pizza," and "4. order delivery of a small pizza." In contrast, the paraphrases of the second permutation of the expanded phrase "find @ food @ size" result in seldom occurring natural language phrases, such as "order delivery of a pizza that is large," "order delivery of a pizza that is medium," and "order delivery of a pizza that is small." Consequently, when the paraphrase generator 136 paraphrases any permutations of the phrase into ungrammatical or unnatural phrases that are seldom occurring in the natural language model 114, the organizer 132 orders such phrases very low in the ordered lists, thereby resulting in a low or no priority for using these infrequently occurring phrases. Consequently, the organizer 132 eliminates any need for humans to manually review any natural language phrases and manually delete any unnatural or grammatically incorrect natural language phrases that were generated from unnatural or grammatically incorrect permutations of the phrase.

Although FIG. 5A depicts only the nine most frequently occurring phrases for each ordered list for the purposes of simplifying the examples, each ordered list can include any number of most frequently occurring phrases. The organizer 132 can limit the number of most frequently occurring phrases, such as using only the 30 most frequently occurring phrases in each list.

At this point in generating natural language phrases, the ordered lists of natural language phrases can be annotated, or an enhanced set of natural language phrases can be generated based on the ordered lists of natural language phrases, so that the enhanced set can be subsequently annotated. Annotating the ordered lists of natural language phrases is described further below in reference to FIGS. 6A-B. FIGS. 5B-E depict the enhanced set of natural language phrases that are generated based on the ordered lists of natural language phrases, and the annotation of the enhanced set of natural language phrases.

Generating the enhanced set of natural language phrases can begin by replacing the instances of the multiple tagged objects in the ordered lists with the multiple tagged objects so that generalized versions of the natural language phrases can be merged from the different ordered lists. The system generates ordered lists of tagged natural language phrases by using each tagged object in the phrase to replace instances of each tagged object in the ordered lists of natural language phrases.

For example, the instantiator 134 references instantiation records, determines that the tagged object "@ size" was previously replaced with the instance "large," determines that the tagged object "@food" was previously replaced with the instance "pizza," uses the tagged object "@ size" to replace each instance of "large" and the tagged object "@food" to replace each instance of "pizza" in the ordered list of natural language pizza phrases. The replacements create an ordered list of tagged natural language phrases 522: "1. order delivery of @size @food," "2. order delivery of @size @food," "3. where is a restaurant that serves @size @food," "4. order delivery of @size @food," "5. where is a restaurant that serves @size @food," "6. which store has a sale on @size @food" "7. where is a restaurant that serves @size @food," "8. which store has a sale on @size @food" "9. which store has a sale on @size @food," etc. In other examples, the instantiator 134 creates the ordered list of tagged natural language phrases 524 and the ordered list of tagged natural language phrases 526. Similarly, the instantiator 134 could create an ordered list of tagged multiple attribute phrases.

Although FIG. 5B depicts only nine tagged natural language phrases for each ordered list of tagged natural language phrases for the purposes of simplifying the examples, each ordered list of tagged natural language phrases can include any number of tagged natural language phrases. If the organizer 132 limits the number of most frequently occurring phrases in each ordered list of tagged natural language phrases, such as using only the 30 most frequently occurring phrases in each ordered list, then the number of tagged natural language phrases in each ordered list of tagged natural language phrases would be limited to the same number.

Once the ordered lists of natural language phrases are converted into tagged natural language phrases, some of these tagged natural language phrases that match are merged from the different ordered lists. The system generates a merged list of tagged natural language phrases by merging corresponding tagged natural language phrases that match each other.

For example, the organizer 132 merges "1. order delivery of @size @food," "2. order delivery of @size @food," and "4. order delivery of @size @food," from the ordered list 522 with "4. order delivery of @size @food," "5. order delivery of @size @food," and "6. order delivery of @size @food," from the ordered list 524 and "7. order delivery of @size @food," "8. order delivery of @size @food," and "9. order delivery of @size @food," from the ordered list 526, to produce the merged tagged natural language phrase "order delivery of @size @food."

In other examples, the organizer 132 produces the merged tagged natural language phrase "where is a restaurant that serves @ size @ food," and the merged tagged natural language phrase "which store has a sale on @size @food." The resulting merged list of tagged natural language phrases 528 is "order delivery of @size @food," "where is a restaurant that serves @size @food," "which store has a sale on @size @food," "where is a store that sells @size @food," etc.

Although FIG. 5B depicts only four tagged natural language phrases in the merged list of tagged natural language phrases for the purposes of simplifying the examples, the merged list of tagged natural language phrases can include any number of tagged natural language phrases. Similarly, the resulting merged list of tagged natural language phrases could include multiple attributes.

The tagged natural language phrases are ordered within the merged list of tagged natural language phrases, based on how often their natural language phrases occur. The system generates an ordered list of tagged natural language phrases by ordering the merged list of tagged natural language phrases based on occurrences of each corresponding natural language phrase. For example, the organizer 132 counts 29 occurrences of "order delivery of a large pizza," 23 occurrences of "order delivery of a medium pizza," 19 occurrences of "order delivery of a small pizza," 17 occurrences of "order delivery of a large taco," 13 occurrences of "order delivery of a small taco," and 11 occurrences of "order delivery of a medium taco." Continuing the example, the organizer 132 counts 7 occurrences of "order delivery of a small apple" 5 occurrences of "order delivery of a large apple" and 3 occurrences of "order delivery of a medium apple" in the natural language model 122, such that the total count is 127 for the merged phrase "order delivery of @size @food."

In other examples, the organizer 132 calculates a total count of 113 for the merged phrase "where is a restaurant that serves @size @food," a total count of 109 for the merged phrase "which store has a sale on @size @food," and a total count of 31 for the merged phrase "where is a store that sells @size @food." The resulting ordered list of tagged natural language phrases 530 is "1. order delivery of @size @food" (based on a count of 127), "2. where is a restaurant that serves @size @food" (based on a count of 113), "3. which store has a sale on @size @food" (based on a count of 109), "4. where is a store that sells @size @food" (based on a count of 31), etc.

Although FIG. 5B depicts only four tagged natural language phrases in the ordered list of tagged natural language phrases for the purposes of simplifying the examples, the ordered list of tagged natural language phrases can include any number of tagged natural language phrases. Similarly, the organizer 132 could generate an ordered list of tagged natural language phrases that include multiple attributes.

The ordered list of tagged natural language phrases are instantiated to generate an enhanced set of natural language phrases that will be annotated. The system generates the enhanced set of natural language phrases by instantiations of each tagged object in the ordered list of tagged natural language phrases. For example, the instantiator 134 instantiates "1. order delivery of @size @food" in the list 530 as "order delivery of a large pizza," "order delivery of a medium pizza," "order delivery of a small pizza," "order delivery of a large taco," "order delivery of a medium taco," "order delivery of a small taco," "order delivery of a large apple," "order delivery of a medium apple," and "order delivery of a small apple."

In other examples, the instantiator 134 instantiates "2. which store has a sale on @size @food" "3. where is a restaurant that serves @size @food" and "4. where is a store that sells @size @food" in the list 530. The resulting enhanced set of natural language phrases 532 is depicted in FIG. 5C. Although FIG. 5C depicts only thirty-six natural language phrases in the enhanced set of natural language phrases for the purposes of simplifying the examples, the enhanced set of natural language phrases can include any number of natural language phrases. Similarly, the instantiator 134 could instantiate tagged natural language phrases that each include multiple attributes to generate an enhanced set of natural language phrases that each include multiple attributes.

The enhanced set of natural language phrases can be annotated for training the NLU engine 130. The system can generate annotated natural language phrases by using each tagged object in the phrase to annotate the enhanced set of natural language phrases that is based on the ordered lists of natural language phrases. For example, the annotator 138 references instantiation records, determines that the tagged object "@size" was previously replaced with the instance "large," determines that the tagged object "@food" was previously replaced with the instance "pizza," and uses the tagged object "@size" to annotate "large" and the tagged object "@food" to annotate "pizza" in the enhanced set of natural language phrases, thereby creating the annotated natural language phrase "order delivery of a large (@size) pizza (@food)." Consequently, the annotator 138 eliminates any need for humans to manually review any natural language phrases and manually annotate any natural language phrases. The resulting enhanced set of annotated natural language phrases 534 is depicted in FIG. 5D.

Although FIG. 5D depicts only thirty-six annotated natural language phrases in the enhanced set of natural language phrases for the purposes of simplifying the examples, the enhanced set of natural language phrases can include any number of annotated natural language phrases. Similarly, each of the annotated natural language phrases in the enhanced set could include multiple attributes.

After annotation of the instances of each tagged object in the natural language phrases, the paraphrased verbs in the natural language phrases are optionally annotated with the verb that was paraphrased. Alternatively, a different process replaces the phrase's verb with natural language paraphrases of the verb, which occurs at a different time. The system might use the verb in the phrase to annotate the enhanced set of natural language phrases that is based on the ordered lists of natural language phrases. For example, the annotator 138 references paraphrasing records, determines that the verb "find" was previously replaced with the instance "order delivery of," and uses the tagged verb "@find" to annotate "order delivery of" in the enhanced set of natural language phrases, thereby creating the annotated natural language phrase "order delivery of (@find) a large (@ size) pizza (@food)."

Consequently, the annotator 138 eliminates any need for humans to manually review any natural language phrases and manually annotate any natural language phrases. The resulting annotated natural language phrases 536 is depicted in FIG. 5E. Although FIG. 5E depicts only thirty-six annotated natural language phrases in the enhanced set of natural language phrases for the purposes of simplifying the examples, the enhanced set of natural language phrases can include any number of annotated natural language phrases. Similarly, each of the annotated natural language phrases in the enhanced set could include multiple attributes.

The annotated natural language phrases can be used to train the NLU engine 130. The system can use the annotated natural language phrases to train a NLU engine to understand a natural language phrase from a user, thereby enabling a response. For example, the trainer 126 uses the annotated natural language phrases 536 to train the NLU engine 130, and the natural language server 106 provides a copy of the personal digital assistant 128 to the smartphone 102. Continuing the example, a person uses the smartphone 102 and says the phrase "order delivery of a large pizza," the NLU engine 130 understands the phrase. This helps the personal digital assistant 128 to prompt the person for details such as pizza toppings, the restaurant to make the pizza, and delivery time and location. The personal digital assistant 128 correctly completes the user's pizza delivery order because the trainer 126 used the annotated natural language phrases 536 to train the NLU engine 130.

Figure 6A:
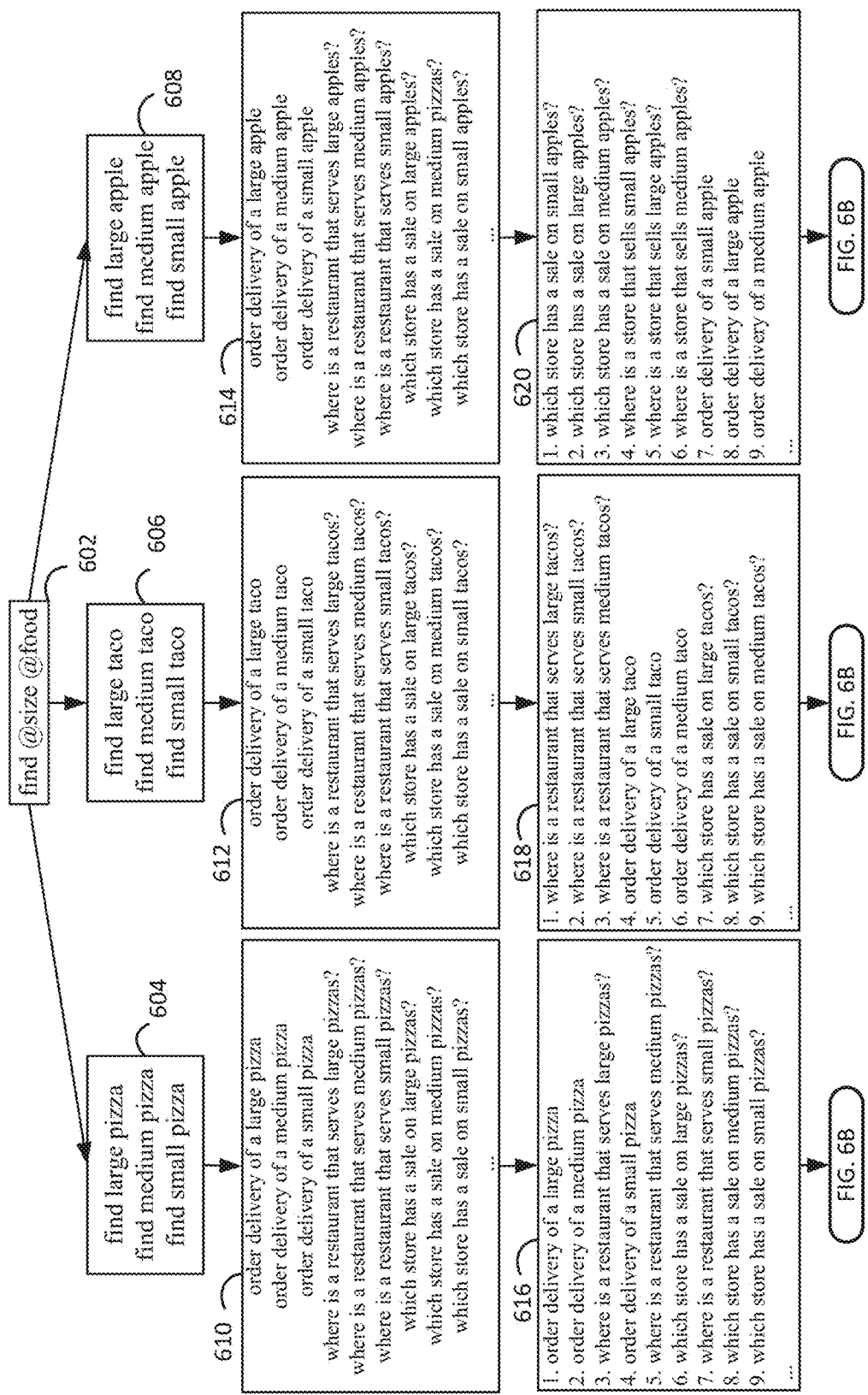
FIGS. 6A-B illustrate an additional block diagram of example generated phrases according to an embodiment.
Figure 6B:
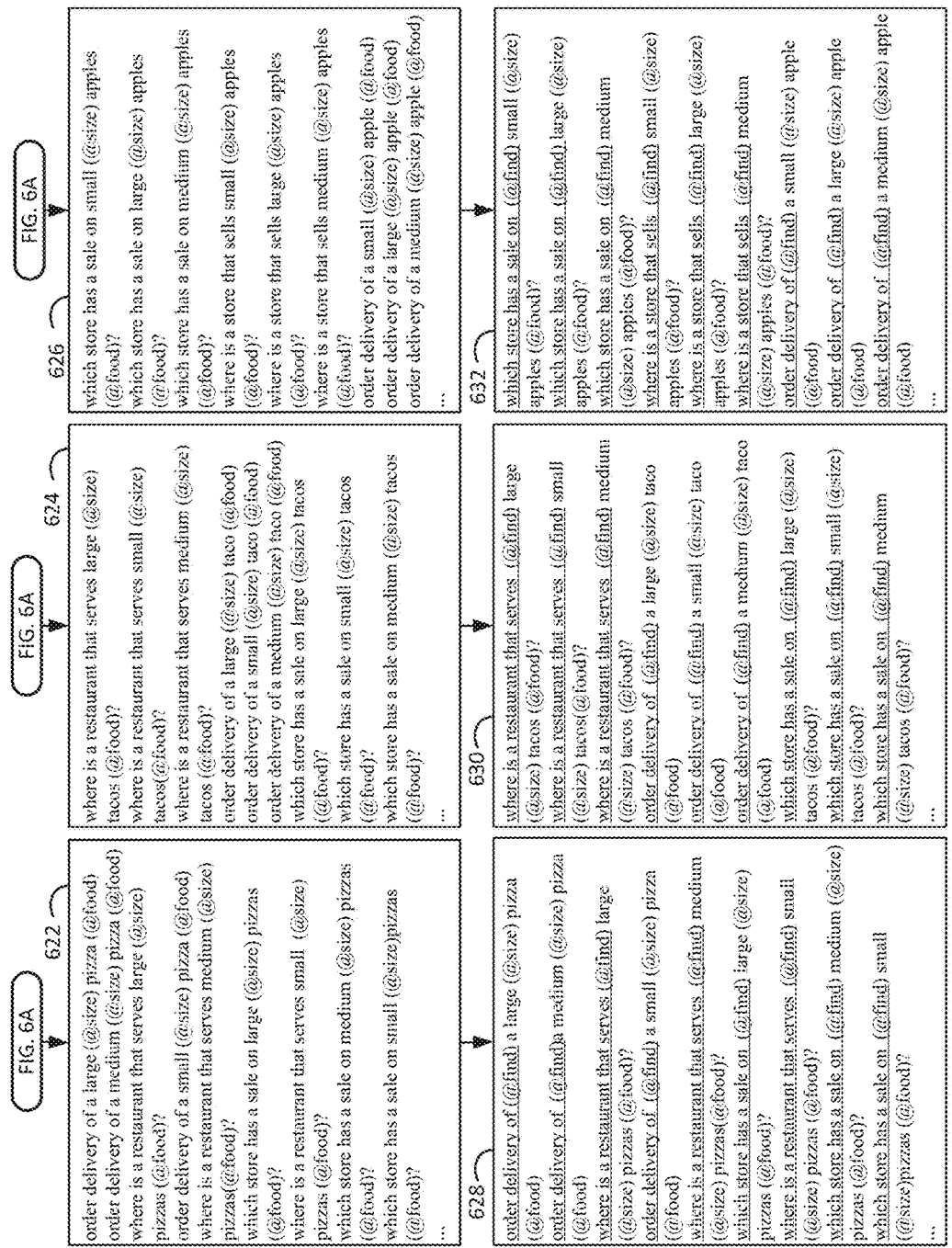

FIGS. 5A-E depict an enhanced set of natural language phrases that is based on the ordered lists of natural language phrases, and the annotation of the enhanced set of natural language phrases. In contrast, FIGS. 6A-B depicts the ordered lists of natural language phrases and the annotation of the ordered lists of natural language phrases. Consequently, the phrases 602-626 depicted in FIGS. 6A-B are substantially similar to the phrases 502-526 depicted in FIGS. 5A-B.

Generation of natural language phrases, such as the natural language phrases depicted in FIGS. 6A-B, can begin by replacing a phrase's multiple tagged objects with natural language instances of the multiple tagged objects. The system generates instantiated phrases by corresponding instantiations of each tagged object in the phrase. For example, the instantiator 134 identifies "size" and "food" in the phrase "find @size @food" 602 as concepts in the knowledge base 122, and then identifies instances of "size" and instances of "food" in the knowledge database 122, including "large," "medium," "small," "pizza," "taco," and "apple." Continuing the example, the instantiator 134 uses these instances to instantiate the phrase "find @size @food" 602 to generate instantiated phrases, such as "find large pizza," "find medium pizza," "find small pizza" 604, "find large taco," "find medium taco," "find small taco" 606, and "find large apple," "find medium apple," "find small apple" 608.

After generating the instantiated phrases, the system generates lists of natural language phrases by corresponding paraphrases of each of the instantiated phrases. For example, the paraphrase generator 136 paraphrases "find large pizza," "find medium pizza," "find small pizza" 604," as the list of natural language pizza phrases: "order delivery of a large pizza," "order delivery of a medium pizza," "order delivery of a small pizza," "where is a restaurant that serves large pizzas," "where is a restaurant that serves medium pizzas," "where is a restaurant that serves small pizzas," . . . 610. In other examples, the paraphrase generator 136 paraphrases "find large taco," "find medium taco," "find small taco" 606 as the list of natural language taco phrases 612, and paraphrases "find large apple," "find medium apple," "find small apple" 608 as the list of natural language apple phrases 614. In a multiple attribute example, the paraphrase generator 136 paraphrases "find large pepperoni pizza" as "order delivery of a large pepperoni pizza," "where is a restaurant that serves large pepperoni pizzas," "what store has a sale on large pepperoni pizzas," etc.

The system generates ordered lists of natural language phrases by ordering natural language phrases in each list of natural language phrases based on occurrences of each natural language phrase. For example, the organizer 132 orders the list of natural language pizza phrases 616 as: "1. order delivery of a large pizza," "2. order delivery of a medium pizza," "3. where is a restaurant that serves large pizzas," "4. order delivery of a small pizza," "5. where is a restaurant that serves medium pizzas," "6. which store has a sale on large pizzas," etc., based on how often these natural language phrases occur in the natural language model 114. In other examples, the organizer 132 orders the list of natural language taco phrases 618 and the list of natural language apple phrases 620 based on the occurrence of each natural language phrase in the natural language model 114. Similarly, the organizer 132 could order a list of multiple attribute pizza phrases based on the occurrence of each natural language phrase in the natural language model 114.

At this point in the generation of natural language phrases, the ordered lists of natural language phrases can be annotated, or enhanced sets of natural language phrases can be generated based on the ordered lists of natural language phrases, so that the enhanced sets can be annotated. Generating an enhanced set of natural language phrases that is based on the ordered lists of natural language phrases and annotating the enhanced set of natural language phrases is described above in reference to FIGS. 5A-E. Annotating the ordered lists of natural language phrases is described directly below in reference to FIGS. 6A-B.

The ordered lists of natural language phrases can be annotated for training the NLU engine 130. The system can generate annotated natural language phrases by using each tagged object in the phrase to annotate the ordered lists of natural language phrases. For example, the annotator 138 references instantiation records, determines that the tagged object "@ size" was previously replaced with the instance "large" and that the tagged object "@food" was previously replaced with the instance "pizza," and uses the tagged object "@ size" to annotate each instance of "large" and the tagged object "@food" to annotate each instance of "pizza" in the ordered lists of natural language phrases. The annotations create the annotated natural language phrase "order delivery of a large (@ size) pizza (@food)." Similarly, the annotations could create annotated natural language phrases that each include multiple attributes.

Consequently, the annotator 138 eliminates any need for humans to manually review any natural language phrases and manually annotate any natural language phrases. The resulting lists of annotated natural language phrases 622, 624, and 626 are depicted in FIG. 6B. Although FIG. 6B depicts only twelve annotated natural language phrases in each of three lists of annotated natural language phrases for the purposes of simplifying the examples, any number of lists of annotated natural language phrases can include any number of annotated natural language phrases.

After annotation of the instances of each tagged object in the natural language phrases, the paraphrased verbs in the natural language phrases are optionally annotated with the verb that was paraphrased. Alternatively, a different process replaces the phrase's verb with natural language paraphrases of the verb, which occurs at a different time. The system might use the verb in the phrase to annotate the ordered lists of natural language phrases. For example, the annotator 138 references paraphrasing records, determines that the verb "find" was previously replaced with the instance "order delivery of," and uses the tagged verb "@find" to annotate "order delivery of" in the ordered lists of natural language phrases, thereby creating the annotated natural language phrase "order delivery of (@find) a large (@ size) pizza (@food)." Similarly, the annotations could create annotated natural language phrases that each include multiple attributes.

Consequently, the annotator 138 eliminates any need for humans to manually review any natural language phrases and manually annotate any natural language phrases. The resulting annotated natural language phrases 628, 630, and 632 are depicted in FIG. 6B. Although FIG. 6B depicts only twelve annotated natural language phrases in each of three lists of annotated natural language phrases for the purposes of simplifying the examples, any number of lists of annotated natural language phrases can include any number of annotated natural language phrases.

The annotated natural language phrases can be used to efficiently train the NLU engine 130. The system can use the annotated natural language phrases to train a NLU engine to understand a natural language phrase from a user, thereby enabling a response. For example, the trainer 126 uses the annotated natural language phrases 628-632 to train the NLU engine 130, and the natural language server 106 provides a copy of the personal digital assistant 128 to the smartphone 102. Continuing the example, a person uses the smartphone 102 and says the phrase "order delivery of a large pizza," the NLU engine 130 understands the phrase, which helps the personal digital assistant 128 to prompt the person for details such as pizza toppings, the restaurant to make the pizza, and delivery time and location. The personal digital assistant 128 correctly completes the person's pizza delivery order because the trainer 126 used the annotated natural language phrases 628-632 to train the NLU engine 130.

The phrases 702-744 depicted in FIGS. 7A-D are similar to the phrases 502-536 depicted in FIGS. 5A-E, except that the phrases 720-744 are based on multiple attributes while the phrases 502-536 are based on a single attribute. The natural language server 106 can initiate generation of annotated natural language phrases after receiving a natural language phrase. For example, the natural language server 106 receives the phrase "order a pizza" 702 that was entered by a developer via the user interface of the laptop computer 104.

The system can identify an object in the natural language phrase and identify any attributes of the identified object in the natural language phrase. For example, the natural language server 106 identifies "pizza" in the natural language phrase "order a pizza" as the object or concept "food" in the knowledge base 122, and then determines that the knowledge base 122 identifies the object or concept "size" and the object or concept "ingredient" as attributes for the object or concept "food." Although this simplified example describes the natural language server 106 identifying only two attributes "size" and "ingredient" for the object "food" identified in the natural language phrase "order a pizza," the natural language server 106 can identify any number of such attributes, such as the objects "size," "ingredient," "supplier," "delivery time," and "delivery location," as attributes for an object, such as the object "food."

Having identified attributes of an object, the system can insert each attribute as a tagged attribute before and after the object in the natural language phrase. For example, the natural language server 106 inserts the object "size" as the tagged object "@ size" into the phrase "order a pizza" 702 to create the first expansion of the expanded phrase "order a @ size pizza" 704 and the second expansion of the expanded phrase "order a pizza @ size" 706. In another example, the natural language server 106 inserts the object "ingredient" as the tagged object "@ingredient" into the phrase "order a pizza" 702 to create the third expansion of the expanded phrase "order a @ingredient pizza" 708 and the fourth expansion of the expanded phrase "order a pizza @ingredient" 710. The natural language server 106 creates expansions by inserting each tagged attribute before and after the identified object in the natural language phrase. Each of these expansions include only a single attribute, instead of all the identified attributes.

After creating and outputting expansions of the natural language phrase based on each individual identified attribute, the system can receive any selected expansions based on each individual identified attribute. For example, the instantiator 134 receives the developer's selection of the first expansion of the expanded phrase "order a @ size pizza" 704, the third expansion of the expanded phrase "order a @ingredient pizza" 708, and the fourth expansion of the expanded phrase "order a pizza @ingredient" 710. In this example, the developer did not select the second expansion of the expanded phrase "order a pizza @ size" 706 because the developer believes that such an expansion would result in generating phrases that are not natural, such as "order delivery of a pizza that is large," instead of the more natural phrase "order delivery of a large pizza." In another example, the instantiator 134 receives the developer's selection of all expansions 704-710 of the expanded phrases. In yet another example, the instantiator 134 automatically receives all expansions 704-710 of the expanded phrases.

Generating natural language phrases, such as the natural language phrases depicted in FIGS. 7 A-D, can begin by replacing a phrase's tagged attribute with natural language instances of the tagged attribute. The system generates instantiated phrases by instantiations of the tagged attribute in the natural language phrase. For example, the instantiator 134 identifies "size" in the phrase "order a @ size pizza" 704 as a concept in the knowledge base 122, and then identifies instances of "size" in the knowledge database 122, including "large," "medium," and "small." Continuing the example, the instantiator 134 uses these instances to instantiate the phrase "order a @ size pizza" 704 to generate instantiated phrases, such as "order a large pizza," "order a medium pizza," "order a small pizza" 712. In another example, the instantiator 134 uses these instances to instantiate the phrase "order a pizza @ size" 706 to generate instantiated phrases, such as "order a pizza that is large," "order a pizza that is medium," "order a pizza that is small" 714. In yet another example, the instantiator 134 uses these instances and the joiner words "of a . . . size" to instantiate the phrase "order a pizza @ size" 706 to generate instantiated phrases such as "order a pizza of a large size," "order a pizza of a medium size," and "order a pizza of a small size." The instantiator 134 can use joiner words to grammatically connect instances of a tagged attribute, such as through the use of the joiner words "that is" between "pizza" and the size attribute. The joiner words are generated using the natural language model 114.

In yet another example. the instantiator 134 identifies "ingredient" in the phrase "order a @ingredient pizza" 708 as a concept in the knowledge base 122, and then identifies instances of "ingredient" in the knowledge database 122, including "pepperoni," "bacon," and "mushrooms." Continuing this example, the instantiator 134 uses these instances to instantiate the phrase "order a @ingredient pizza" 708 to generate instantiated phrases, such as "order a pepperoni pizza," "order a bacon pizza," "order a mushroom pizza" 716. In an additional example, the instantiator 134 uses these instances to instantiate the phrase "order a pizza @ingredient" 710 to generate instantiated phrases, such as "order a pizza with pepperoni," "order a pizza with bacon," "order a pizza with mushrooms" 718. The instantiator 134 can use joiner words to grammatically connect instances of a tagged attribute, such as through the use of the joiner words "with" between "pizza" and the ingredient attribute.

Figure 7A:
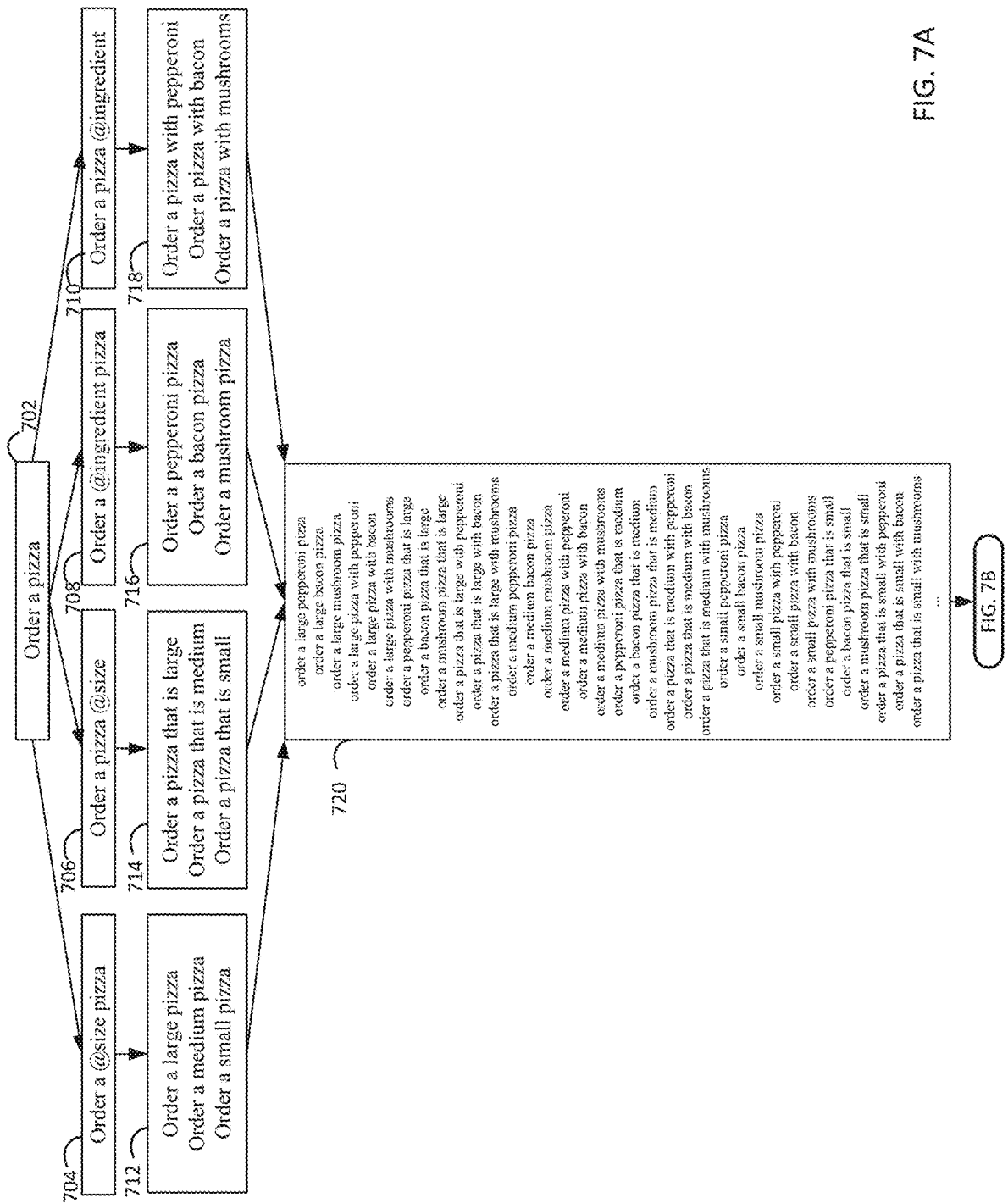

FIG. 7A depicts only twelve instantiated phrases for the purposes of simplifying the examples, but the instantiator 134 can generate any number of instantiated phrases. The instantiator 134 can limit the number of instances, such as using only the 30 most frequently identified instances of "ingredients" and the 30 most frequently identified instances of "sizes," which would consequently limit the number of instantiated phrases to the number of the combinations of these instances, such as 900 instantiated phrases.

After replacing the phrase's tagged attributes with instances of the tagged attributes, combined instantiated phrases are created by combining the instantiated phrases. Following the generation of the instantiated phrases, the system combines the instantiated phrases. For example, the natural language server 106 combines the instantiated phrases, "order a large pizza," "order a medium pizza," "order a small pizza" 712 with "order a pepperoni pizza," "order a bacon pizza," "order a mushroom pizza" 716, and "order a pizza with pepperoni," "order a pizza with bacon," "order a pizza with mushrooms" 718 to create the combined instantiated phrases 720. In this example, the combined instantiated phrases 720 include "order a large pepperoni pizza" and "order a pizza that is small with mushrooms." FIG. 7A depicts only thirty-six combined instantiated phrases for the purposes of simplifying the examples, but the natural language server 106 can generate any number of combined instantiated phrases.

Having combined instantiated phrases, the phrases' verb can be replaced with natural language paraphrases of the verb. Following the combination of instantiated phrases, the system generates lists of natural language phrases by corresponding paraphrases of each of the instantiated phrases. For example, the paraphrase generator 136 paraphrases the combined instantiated phrases 720 "order a large pepperoni pizza," etc., as the list of natural language phrases 722: "order delivery of a large pepperoni pizza," etc., the list of natural language phrases 724: "which restaurant serves large pepperoni pizzas," etc., and the list of natural language phrases 726: "which store sells large pepperoni pizzas," etc. In another example, the paraphrase generator 136 paraphrases the instantiated phrase "find a pizza restaurant near home" as "get a pizza restaurant near home," "where is a pizza restaurant near home," (where/which/when/why/who paraphrasing) and "I want a pizza restaurant near home" (phrases that start with "I"). The goal of the paraphrase generator 136 is to increase the varieties of predicates, which are the prefixes of the phrases.

FIG. 7B depicts only three instantiated paraphrases, 722 "order delivery of," 724 "which restaurant serves," and 726 "which store sells" as paraphrases of the words "order a" for the purposes of simplifying the examples. The paraphrase generator 136, however, can generate any number of paraphrases. The paraphrase generator 136 can limit the number of paraphrases, such as using only the 30 most common paraphrases of "order a."

The occurrences of each natural language phrase are calculated so that a high ordering is assigned to frequently occurring natural language phrases and a low ordering is assigned to seldom occurring natural language phrases. The system generates an ordered list of natural language phrases by ordering natural language phrases in the list of natural language phrases based on occurrences of each natural language phrase. For example, the organizer 132 orders the list of natural language "order a pizza" phrases 728 as: "1. order delivery of a large pepperoni pizza," "2. which restaurant serves a medium pizza with mushrooms," "3. which store sells a large pepperoni pizza," "4. order delivery of a medium pepperoni pizza," "5. which restaurant serves a large pepperoni pizza," "6. order delivery of a large pizza with bacon," etc., based on how often these natural language phrases occur in the natural language model 114.

The paraphrases of the combined expanded phrases result in frequently occurring natural language phrases, such as "1. order delivery of a large pepperoni pizza," and in seldom occurring natural language phrases, such as "order delivery of a pizza that is small with mushrooms." Consequently, when the paraphrase generator 136 paraphrases any combinations of the expanded phrases into ungrammatical or unnatural phrases that are seldom occurring in the natural language model 114, the organizer 132 orders such phrases very low in the ordered list, thereby resulting in a low or no priority for using these infrequently occurring phrases. Consequently, the organizer 132 eliminates any need for humans to manually review any natural language phrases and manually delete any unnatural or grammatically incorrect natural language phrases that were generated from unnatural or grammatically incorrect combinations of the expanded phrases.

Following the generation of an ordered list based on a natural language phrase, the system generates another ordered list based on another natural language phrase. For example, the natural language server 106 receives the phrase "order a taco" 730 that was entered by a developer via the user interface of the laptop computer 104. Then the natural language server 106 can repeat the same process that generated the ordered list of natural language "order a pizza" phrases 728 to generate the ordered list of natural language "order a taco" phrases 732.

In an alternative example, the natural language server 106 identifies "pizza" in the natural language phrase "order a pizza" 702 as an instance of the object or concept "food" in the knowledge base 122, and then determines that the knowledge base 122 identifies "taco" as another instance of the object or concept "food." For this alternative example, the natural language server 106 can repeat the same process that generated the ordered list of natural language "order a pizza" phrases 728 to generate the ordered list of natural language "order a taco" phrases 732, or the natural language server 106 can output the phrase "order a taco" 730 as a suggestion for the developer to request the generation of the corresponding ordered list 732.

Although FIG. 7C depicts only the six most frequently occurring phrases for each of two ordered lists for the purposes of simplifying the examples, any number of ordered lists can include any number of most frequently occurring phrases. The organizer 132 can limit the number of most frequently occurring phrases, such as using only the 30 most frequently occurring phrases in each list.

At this point in generating natural language phrases, the ordered lists of natural language phrases can be annotated, or an enhanced set of natural language phrases can be generated based on the ordered lists of natural language phrases, so that the enhanced set can be subsequently annotated. Annotating the ordered lists of natural language phrases is described further below in reference to FIGS. 8A-C. FIGS. 7C-D depict the enhanced set of natural language phrases that are generated based on the ordered lists of natural language phrases, and the annotation of the enhanced set of natural language phrases.

Generating the enhanced set of natural language phrases can begin by replacing the instances of the multiple tagged objects in the ordered lists with the multiple tagged objects so that generalized versions of the natural language phrases can be merged from the different ordered lists. The system generates ordered lists of tagged natural language phrases by using each tagged object in the phrase to replace instances of each tagged object in the ordered lists of natural language phrases.

For example, the instantiator 134 references instantiation records, determines that the tagged attribute "@ size" was previously replaced with the instance "large," determines that the tagged attribute "@ingredient" was previously replaced with the instance "pepperoni," determines that "pizza" is an instance of the object "food," uses the tagged attribute "@ size" to replace each instance of "large," the tagged attribute "@ingredient" to replace each instance of "pepperoni," and the tagged object "@food" to replace each instance of "pizza" in the ordered list of natural language "order a pizza" phrases 728. The replacements create an ordered list of tagged natural language phrases 734: "1. order delivery of a @size @ingredient @food," "2. which restaurant serves @size @food with @ingredient," "3. which store sells @size @ingredient @food," "4. order delivery of a @size @ingredient @food," "5. which restaurant serves @size @ingredient @food," "6. order delivery of @size @food with @ingredient," etc. In another example, the instantiator 134 creates the ordered list of tagged natural language phrases 736.

Although FIG. 7C depicts only six tagged natural language phrases for each of two ordered lists of tagged natural language phrases for the purposes of simplifying the examples, any number of ordered lists of tagged natural language phrases can include any number of tagged natural language phrases. If the organizer 132 limits the number of most frequently occurring phrases in each ordered list of tagged natural language phrases, such as using only the 30 most frequently occurring phrases in each ordered list, then the number of tagged natural language phrases in each ordered list of tagged natural language phrases would be limited to the same number.

Once the ordered lists of natural language phrases are converted into tagged natural language phrases, the tagged natural language phrases that match are merged from the different ordered lists. The system generates a merged list of tagged natural language phrases by merging corresponding tagged natural language phrases that match each other. For example, the organizer 132 merges "1. order delivery of a @size @ingredient @food," "and "4. order delivery of a @size @ingredient @food," from the ordered list 734 with "1. order delivery of a @size @ingredient @food," "and "4. order delivery of a @size @ingredient @food," from the ordered list 736 to produce the merged tagged natural language phrase "order delivery of a @ size @ ingredient @ food."

In other examples, the organizer 132 produces the merged tagged natural language phrase "which restaurant serves @size @ingredient @food," the merged tagged natural language phrase "order delivery of a @ size @ food with @ ingredient," and the merged tagged natural language phrase "which store sells @size @ingredient @food." The resulting merged list of tagged natural language phrases 738 is "order delivery of a @size @ingredient @food," "which restaurant serves @size @ingredient @food," "order delivery of a @size @food with @ingredient," "which store sells @size @ingredient @food," "which restaurant serves @size @food with @ingredient," etc. Although FIG. 7C depicts only five tagged natural language phrases in the merged list of tagged natural language phrases for the purposes of simplifying the examples, the merged list of tagged natural language phrases can include any number of tagged natural language phrases.

The tagged natural language phrases are ordered within the merged list of tagged natural language phrases, based on how often their natural language phrases occur. The system generates an ordered list of tagged natural language phrases by ordering the merged list of tagged natural language phrases based on occurrences of each corresponding natural language phrase. For example, the organizer 132 counts 29 occurrences of "order delivery of a large pepperoni pizza," 23 occurrences of "order delivery of a large beef taco," 19 occurrences of "order delivery of a medium pepperoni pizza," and 17 occurrences of "order delivery of a medium beef taco," such that the total count is 88 for the merged phrase "order delivery of a @size @ingredient @food."

In other examples, the organizer 132 calculates a total count of 65 for the merged phrase "which restaurant serves @size @ingredient @food," a total count of 43 for the merged phrase "order delivery of a @size @food with @ingredient," a total count of 45 for the merged phrase "which store sells @size @ingredient @food," and a total count of 21 for the merged phrase "which restaurant serves @size @food with @ingredient." The resulting ordered list of tagged natural language phrases 740 is "1. order delivery of a @size @ingredient @food" (based on a count of 88), "2. which restaurant serves @size @ingredient @food" (based on a count of 65), "3. which store sells @size @ingredient @food" (based on a count of 45), "4. order delivery of a @size @food with @ingredient" (based on a count of 43), "5. which restaurant serves @size @food with @ingredient" (based on a count of 21), etc. Although FIG. 7B depicts only five tagged natural language phrases in the ordered list of tagged natural language phrases for the purposes of simplifying the examples, the ordered list of tagged natural language phrases can include any number of tagged natural language phrases.

The ordered list of tagged natural language phrases are instantiated to generate an enhanced set of natural language phrases that will be annotated. The system generates the enhanced set of natural language phrases by instantiations of each tagged object in the ordered list of tagged natural language phrases. For example, the instantiator 134 instantiates "1. order delivery of @size @ingredient @food" in the list 740 as "order delivery of a large pepperoni pizza," "order delivery of a large bacon pizza," "order delivery of a medium pepperoni pizza," "order delivery of a medium bacon pizza," "order delivery of a small pepperoni pizza," "order delivery of a small bacon pizza," "order delivery of a large beef taco," "order delivery of a large chicken taco," "order delivery of a medium beef taco," "order delivery of a medium chicken taco," "order delivery of a small beef taco," and "order delivery of a small chicken taco," etc. 742.

In other examples, the instantiator 134 instantiates "2. which restaurant serves @size @ingredient @food," "3. which store sells @size @ingredient @food," "4. order delivery of a @size @food with @ingredient," and "5. which restaurant serves @size @food with @ingredient" in the list 740. Although FIG. 7D depicts only twelve natural language phrases in the enhanced set of natural language phrases 742 for the purposes of simplifying the examples, the enhanced set of natural language phrases can include any number of natural language phrases.

The enhanced set of natural language phrases can be annotated for training the NLU engine 130. The system can generate annotated natural language phrases by using each tagged object in the phrase to annotate the enhanced set of natural language phrases that is based on the ordered lists of natural language phrases. For example, the annotator 138 references instantiation records, determines that the tagged attribute "@ size" was previously replaced with the instance "large," determines that the tagged attribute "@ingredient" was previously replaced with the instance "pepperoni," determines that "pizza" is an instance of the object "food," and uses the tagged attribute "@ size" to annotate "large," the tagged object "@ingredient" to annotate "pepperoni" and the tagged object "@food" to annotate "pizza" in the enhanced set of natural language phrases, thereby creating the annotated natural language phrase "order delivery of a large (@ size) pepperoni (@ingredient) pizza (@food)." Consequently, the annotator 138 eliminates any need for humans to manually review any natural language phrases and manually annotate any natural language phrases. The resulting enhanced set of annotated natural language phrases 744 is depicted in FIG. 7D. Although FIG. 7D depicts only twelve annotated natural language phrases in the enhanced set of natural language phrases for the purposes of simplifying the examples, the enhanced set of natural language phrases can include any number of annotated natural language phrases.

The annotated natural language phrases can be used to train the NLU engine 130. The system can use the annotated natural language phrases to train a NLU engine to understand a natural language phrase from a user, thereby enabling a response. For example, the trainer 126 uses the annotated natural language phrases 744 to train the NLU engine 130, and the natural language server 106 provides a copy of the personal digital assistant 128 to the smartphone 102. Continuing the example, a person uses the smartphone 102 and says the phrase "order delivery of a large pepperoni pizza," the NLU engine 130 understands the phrase. This helps the personal digital assistant 128 to prompt the person for details, such as the restaurant to make the pizza, and delivery time and location. The personal digital assistant 128 correctly completes the user's pizza delivery order because the trainer 126 used the annotated natural language phrases 744 to train the NLU engine 130.

Figure 8A:
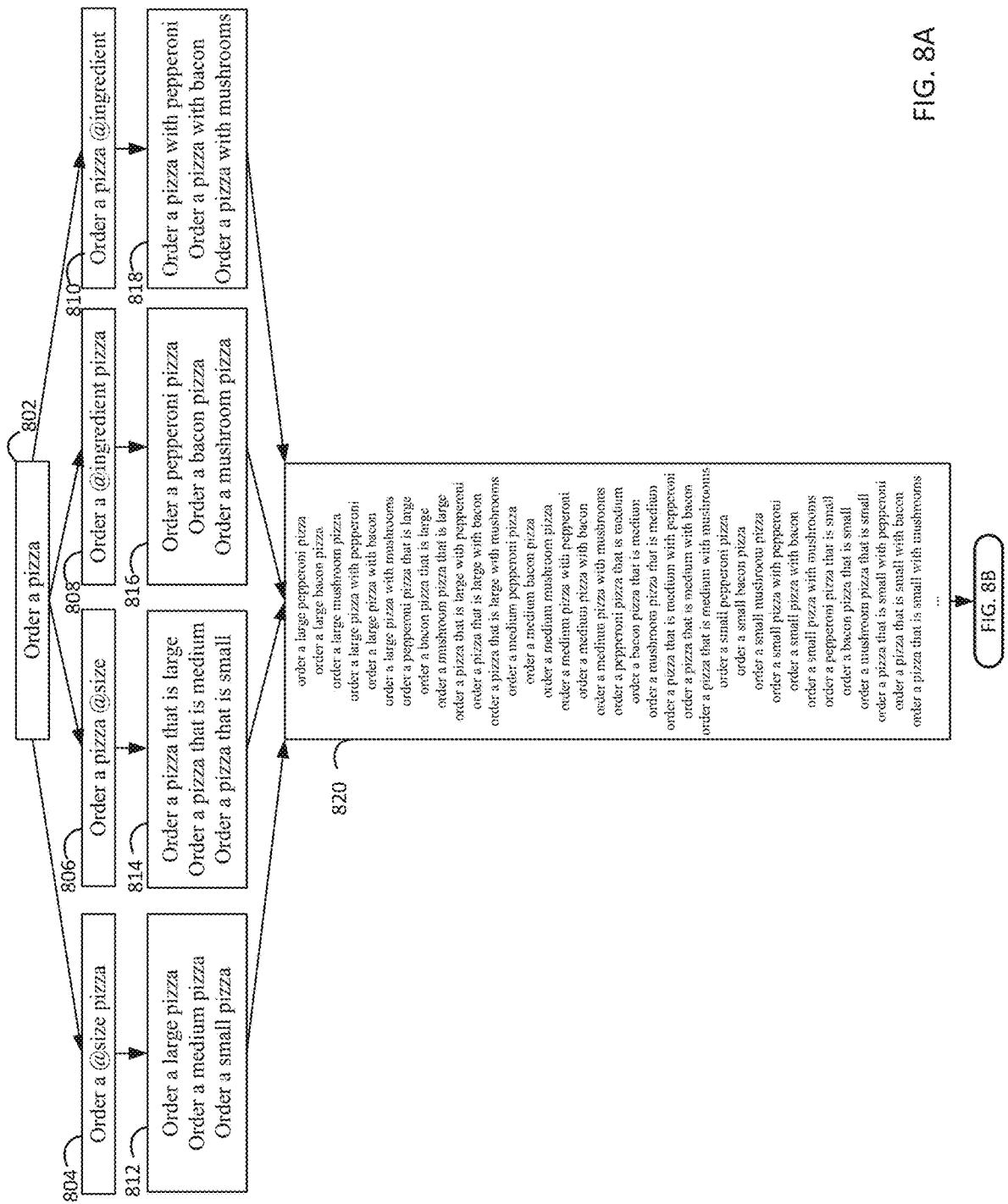

FIGS. 7A-D depict an enhanced set of natural language phrases that is based on the ordered lists of natural language phrases, and the annotation of the enhanced set of natural language phrases. In contrast, FIGS. 8A-C depicts the ordered lists of natural language phrases and the annotation of the ordered lists of natural language phrases. Consequently, the phrases 802-832 depicted in FIGS. 8A-C are substantially similar to the phrases 702-732 depicted in FIGS. 7A-C.

The natural language server 106 initiates generation of annotated natural language phrases after receiving a natural language phrase. For example, the natural language server 106 receives the phrase "order a pizza" 802 that was entered by a developer via the user interface of the laptop computer 104.

Having received the natural language phrase that was entered by the developer, the system can identify an object in the natural language phrase and identify any attributes of the identified object in the natural language phrase. For example, the natural language server 106 identifies "pizza" in the natural language phrase "order a pizza" as the object or concept "food" in the knowledge base 122, and then determines that the knowledge base 122 identifies the object or concept "size" and the object or concept "ingredient" as attributes for the object or concept "food."

Having identified attributes of an object, the system can insert each attribute as a tagged object into the natural language phrase. For example, the natural language server 106 inserts the object "size" as the tagged object "@ size" into the phrase "order a pizza" 802 to create the first permutation of the expanded phrase "order a @ size pizza" 804 and the second permutation of the expanded phrase "order a pizza @ size" 806. In another example, the natural language server 106 inserts the object "ingredient" as the tagged object "@ingredient" into the phrase "order a pizza" 802 to create the third permutation of the expanded phrase "order a @ingredient pizza" 808 and the fourth permutation of the expanded phrase "order a pizza @ ingredient" 810.

After creating and outputting permutations of the natural language phrase based on each individual identified attribute, the system can receive any selected permutations based on each individual identified attribute. For example, the instantiator 134 receives the developer's selection of the first permutation of the expanded phrase "order a @ size pizza" 804, the third permutation of the expanded phrase "order a @ingredient pizza" 808, and the fourth permutation of the expanded phrase "order a pizza @ingredient" 810. In this example, the developer did not select the second permutation of the expanded phrase "order a pizza @ size" 806 because the developer believes that such a permutation would result in generating phrases that are not natural, such as "order delivery of a pizza that is large," instead of the more natural phrase "order delivery of a large pizza." In another example, the instantiator 134 receives the developer's selection of all permutations 804-810 of the expanded phrases. In yet another example, the instantiator 134 automatically receives all permutations 804-810 of the expanded phrases.

Generating natural language phrases, such as the natural language phrases depicted in FIGS. 8A-C, can begin by replacing a phrase's tagged attribute with natural language instances of the tagged attribute. The system generates instantiated phrases by instantiations of the tagged attribute in the natural language phrase. In one embodiment, the instantiator 134 identifies "size" in the phrase "order a @ size pizza" 804 as a concept in the knowledge base 122, and then identifies instances of "size" in the knowledge database 122, including "large," "medium," and "small." Continuing the example, the instantiator 134 uses these instances to instantiate the phrase "order a @ size pizza" 804 to generate instantiated phrases, such as "order a large pizza," "order a medium pizza," "order a small pizza" 812. In another example, the instantiator 134 uses these instances to instantiate the phrase "order a pizza @ size" 806 to generate instantiated phrases, such as "order a pizza that is large," "order a pizza that is medium," "order a pizza that is small" 814. The instantiator 134 can use joiner words to grammatically connect instances of a tagged attribute, such as through the use of the joiner words "that is" between "pizza" and the size attribute.

In yet another example, the instantiator 134 identifies "ingredient" in the phrase "order a @ingredient pizza" 808 as a concept in the knowledge base 122, and then identifies instances of "ingredient" in the knowledge database 122, including "pepperoni," "bacon," and "mushrooms." Continuing the example, the instantiator 134 uses these instances to instantiate the phrase "order a @ingredient pizza" 808 to generate instantiated phrases, such as "order a pepperoni pizza," "order a bacon pizza," "order a mushroom pizza" 816. In an additional example, the instantiator 134 uses these instances to instantiate the phrase "order a pizza @ingredient" 810 to generate instantiated phrases, such as "order a pizza with pepperoni," "order a pizza with bacon," "order a pizza with mushrooms" 818. The instantiator 134 can use joiner words to grammatically connect instances of a tagged attribute, such as through the use of the joiner words "with" between "pizza" and the ingredient attribute.

After replacing the phrase's tagged attributes with instances of the tagged attributes, the permutations of the instantiated phrases are combined. Following the generation of the instantiated phrases, the system combines the permutations of the instantiated phrases. For example, the natural language server 106 combines the permutations of the instantiated phrases, "order a large pizza," "order a medium pizza," "order a small pizza" 812 with "order a pepperoni pizza," "order a bacon pizza," "order a mushroom pizza" 816, and "order a pizza with pepperoni," "order a pizza with bacon," "order a pizza with mushrooms" 818 to create the combined permutations of the instantiated phrases 820. In this example, the combined permutations of the instantiated phrases 820 include "order a large pepperoni pizza" and "order a pizza that is small with mushrooms."

Having combined permutations of instantiated phrases, the phrases' verb can be replaced with natural language paraphrases of the verb. Following the combination of permutations of the instantiated phrases, the system generates lists of natural language phrases by corresponding paraphrases of each of the instantiated phrases. For example, the paraphrase generator 136 paraphrases the combined permutations of the instantiated phrases 820 "order a large pepperoni pizza," etc., as the list of natural language phrases 822: "order delivery of a large pepperoni pizza," the list of natural language phrases 824: "which restaurant serves large pepperoni pizzas," and the list of natural language phrases 826: "which store sells large pepperoni pizzas," etc.

The occurrences of each natural language phrase are calculated so that a high ordering is assigned to frequently occurring natural language phrases and a low ordering is assigned to seldom occurring natural language phrases. The system generates an ordered list of natural language phrases by ordering natural language phrases in the list of natural language phrases based on occurrences of each natural language phrase. For example, the organizer 132 orders the list of natural language "order a pizza" phrases 828 as: "1. order delivery of a large pepperoni pizza," "2. which restaurant serves medium pizzas with mushrooms," "3. which store sells large pepperoni pizzas," "4. order delivery of a medium pepperoni pizza," "5. which restaurant serves large pepperoni pizzas," "6. order delivery of a large pizza with bacon," etc., based on how often these natural language phrases occur in the natural language model 114.

The paraphrases of the combined permutations of the expanded phrases result in frequently occurring natural language phrases, such as "1. order delivery of a large pepperoni pizza," and in seldom occurring natural language phrases, such as "order delivery of a pizza that is small with mushrooms." Consequently, when the paraphrase generator 136 paraphrases any permutations of the expanded phrases into ungrammatical or unnatural phrases that are seldom occurring in the natural language model 114, the organizer 132 orders such phrases very low in the ordered list, thereby resulting in a low or no priority for using these infrequently occurring phrases. Consequently, the organizer 132 eliminates any need for humans to manually review any natural language phrases and manually delete any unnatural or grammatically incorrect natural language phrases that were generated from unnatural or grammatically incorrect permutations of the expanded phrases.

Following the generation of an ordered list based on a natural language phrase, the system generates another ordered list based on another natural language phrase. For example, the natural language server 106 receives the phrase "order a taco" 830 that was entered by a developer via the user interface of the laptop computer 104. Then the natural language server 106 can repeat the same process that generated the ordered list of natural language "order a pizza" phrases 828 to generate the ordered list of natural language "order a taco" phrases 832.

In an alternative example, the natural language server 106 identifies "pizza" in the natural language phrase "order a pizza" 802 as an instance of the object or concept "food" in the knowledge base 122, and then determines that the knowledge base 122 identifies "taco" as another instance of the object or concept "food." For this alternative example, the natural language server 106 can repeat the same process that generated the ordered list of natural language "order a pizza" phrases 828 to generate the ordered list of natural language "order a taco" phrases 832, or the natural language server 106 can output the phrase "order a taco" 830 as a suggestion for the developer to request the generation of the corresponding ordered list 832.

At this point in the generation of natural language phrases, the ordered lists of natural language phrases can be annotated, or enhanced sets of natural language phrases can be generated based on the ordered lists of natural language phrases, so that the enhanced sets can be annotated. Generating an enhanced set of natural language phrases that is based on the ordered lists of natural language phrases and annotating the enhanced set of natural language phrases is described above in reference to FIGS. 7A-D. Annotating the ordered lists of natural language phrases is described directly below in reference to FIGS. 8A-C.

The ordered lists of natural language phrases can be annotated for training the NLU engine 130. The system can generate annotated natural language phrases by using each tagged object in the phrase to annotate the ordered lists of natural language phrases. For example, the annotator 138 references instantiation records, determines that the tagged attribute "@ size" was previously replaced with the instance "large," that the tagged attribute "@ingredient" was previously replaced with the instance "pepperoni," and that the object "pizza" is an instance of the object or concept "food," and uses the tagged attribute "@ size" to annotate each instance of "large," the tagged attribute "@ingredient" to annotate each instance of "pepperoni," and the tagged object "@food" to annotate each instance of "pizza" in the ordered lists of natural language phrases. The annotations create the annotated natural language phrase "order delivery of a large (@ size) pepperoni (@ingredient) pizza (@food)."

Consequently, the annotator 138 eliminates any need for humans to manually review any natural language phrases and manually annotate any natural language phrases. The resulting lists of annotated natural language phrases 834 and 836 are depicted in FIG. 8C. Although FIG. 8C depicts only six annotated natural language phrases in each of two lists of annotated natural language phrases for the purposes of simplifying the examples, any number of lists of annotated natural language phrases can include any number of annotated natural language phrases.

The annotated natural language phrases can be used to efficiently train the NLU engine 130. The system can use the annotated natural language phrases to train a NLU engine to understand a natural language phrase from a user, thereby enabling a response. For example, the trainer 126 uses the annotated natural language phrases 834 and 836 to train the NLU engine 130, and the natural language server 106 provides a copy of the personal digital assistant 128 to the smartphone 102. Continuing the example, a person uses the smartphone 102 and says the phrase "order delivery of a large pepperoni pizza," the NLU engine 130 understands the phrase, which helps the personal digital assistant 128 to prompt the person for details such as the restaurant to make the pizza, and delivery time and location. The personal digital assistant 128 correctly completes the person's pizza delivery order because the trainer 126 used the annotated natural language phrases 834 and 836 to train the NLU engine 130.

Figure 9:
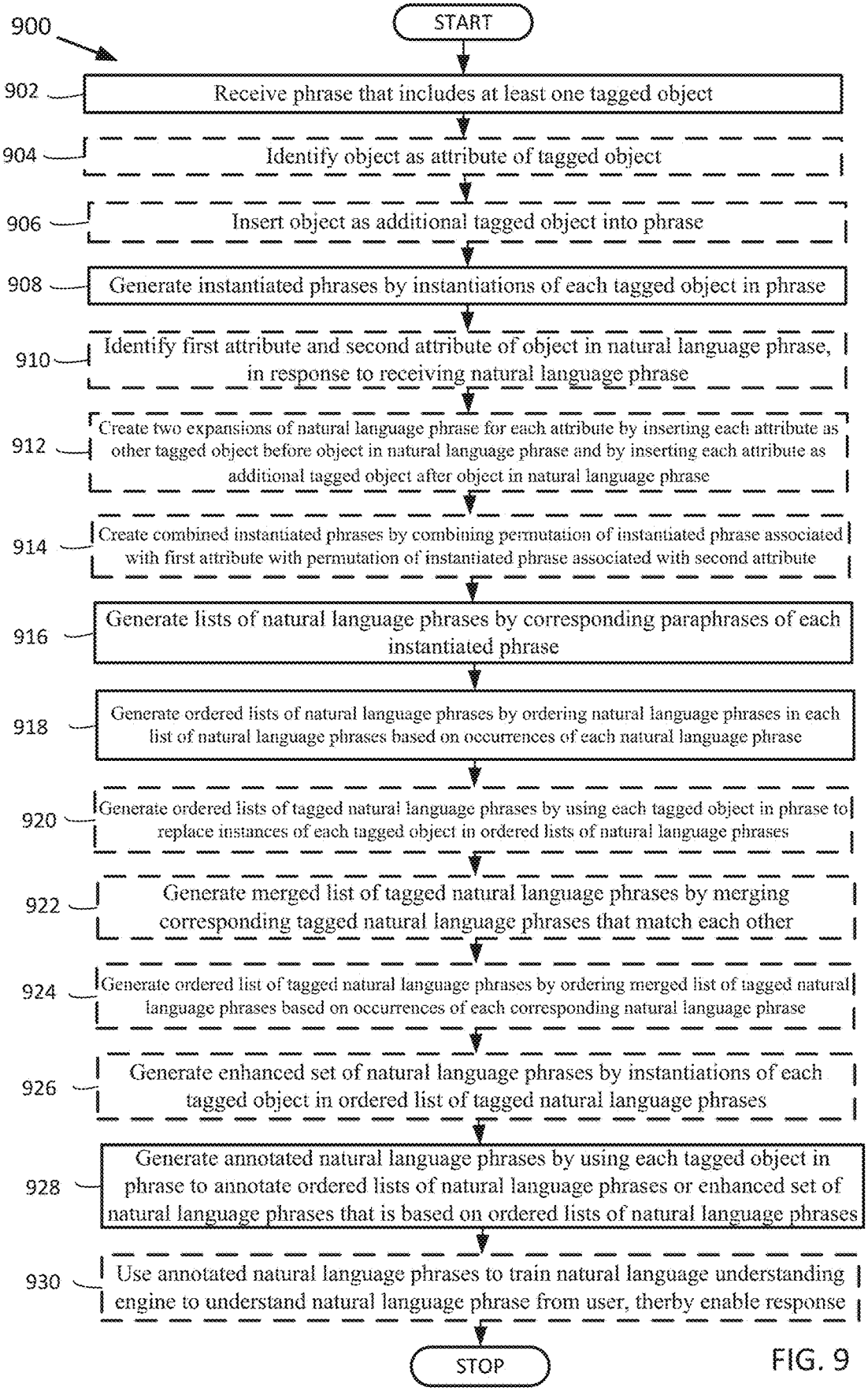
FIG. 9 is a flowchart that illustrates a method for generating annotated natural language phrases according to an embodiment.

FIG. 9 is a flowchart that illustrates a method for generating annotated natural language phrases according to an embodiment. Flowchart 900 illustrates method acts illustrated as flowchart blocks for certain steps involved in and/or between the clients 102-104 and/or the servers 106-108 of FIG. 1.

A phrase that includes at least one tagged object is received, block 902. The system initiates generation of annotated natural language phrases. In embodiments, this may include the natural language server 106 receiving the phrase "find @food" that was entered by a developer via the user interface of the laptop computer 104. In another example, after receiving "order a pizza" from a developer, the natural language server 106 recognizes "pizza" as a type of food, and generates the tagged phrase "order @food."

After receiving the phrase, an object is optionally identified as an attribute of any tagged object in the phrase, block 904. The system can identify attributes for expanding the phrase. For example, and without limitation, this may include the instantiator 134 extracting the tagged object "@food" from the phrase "find @food," determining that "food" is an object in the knowledge base 122, and then determining that the knowledge base 122 identifies the object "size" as an attribute for the object "food."

Following identification of an object as an attribute of a tagged object, the object is optionally inserted as a tagged object into the phrase, block 906. The system can expand the phrase with any attributes of a tagged object. By way of example and without limitation, this may include the instantiator 134 inserting the object "size" as the additional tagged object "@ size" into the phrase "find @food" to create the expanded phrase "find @size @food."

Instantiated phrases are generated by instantiations of each tagged object in the phrase, block 908. The system replaces each tagged object with natural language instances of the tagged object. In embodiments, this may include the instantiator 134 identifying "food" in the phrase "find @food" 302 as a concept in the knowledge base 122, and then identifying instances of "food" in the knowledge database 122, including "pizza," "taco," and "apple." Continuing the example, the instantiator 134 uses these instances to instantiate the phrase "find @food" 302 to generate instantiated phrases, such as "find pizza" 304, "find taco" 306, and "find apple" 308. In another example, the instantiator 134 identifies "size" in the phrase "order a @ size pizza" 704 as a concept in the knowledge base 122, and then identifies instances of "size" in the knowledge database 122, including "large," "medium," and "small." Continuing the example, the instantiator 134 uses these instances to instantiate the phrase "order a @ size pizza" 704 to generate instantiated phrases, such as "order a large pizza," "order a medium pizza," "order a small pizza" 712.

An object in a natural language phrase and any attributes of the identified object in the natural language phrase are optionally identified, in response to receiving the natural language phrase that was entered by a developer, block 910. The system can identify attributes of objects in developers' natural language phrases. For example, and without limitation, this may include the natural language server 106 identifying "pizza" in the natural language phrase "order a pizza" received from a developer as the object or concept "food" in the knowledge base 122, and then determining that the knowledge base 122 identifies the object or concept "size" and the object or concept "ingredient" as attributes for the object or concept "food."

Having identified attributes of an object, expansions of the natural language phrase are optionally created by inserting each attribute as a tagged object before and after the object in the natural language phrase, block 912. The system creates expansions of the natural language phrase based on the identified attributes. By way of example and without limitation, this may include the natural language server 106 inserting the object "size" as the tagged object "@ size" into the phrase "order a pizza" 802 to create the first expansion of the expanded phrase "order a @ size pizza" 804 and the second expansion of the expanded phrase "order a pizza @ size" 806. In another example, the natural language server 106 inserts the object "ingredient" as the tagged object "@ingredient" into the phrase "order a pizza" 802 to create the third expansion of the expanded phrase "order a @ingredient pizza" 808 and the fourth expansion of the expanded phrase "order a pizza @ingredient" 810.

Combined instantiated phrases are optionally created by combining a permutation of an instantiated phrase associated with a first attribute with a permutation of an instantiated phrase associated with a second attribute, block 914. The system uses each attribute to combine permutations of the instantiated phrases. For example, and without limitation, this may include the natural language server 106 combining the expansions of the instantiated phrases, "order a large pizza," "order a medium pizza," "order a small pizza" 812 with "order a pepperoni pizza," "order a bacon pizza," "order a mushroom pizza" 816, and "order a pizza with pepperoni," "order a pizza with bacon," "order a pizza with mushrooms" 818 to create the combined permutations of the instantiated phrases 820. In this example, the combined permutations of the instantiated phrases 820 include "order a large pepperoni pizza" and "order a pizza that is small with mushrooms."

Having generated the instantiated phrases, lists of natural language phrases are generated by corresponding paraphrases of each of the instantiated phrases, block 916. The system replaces the phrase's verb with natural language paraphrases of the verb. By way of example and without limitation, this may include the paraphrase generator 136 paraphrasing "find pizza" 304" as the list of natural language pizza phrases: "order delivery of a pizza," "where is a restaurant that serves pizzas," "what store has a sale on pizzas," . . . 310. In another example, the paraphrase generator 136 paraphrases the combined instantiated phrases 720 "order a large pepperoni pizza," etc., as the list of natural language phrases 722: "order delivery of a large pepperoni pizza," etc., the list of natural language phrases 724: "which restaurant serves large pepperoni pizzas," etc., and the list of natural language phrases 726: "which store sells large pepperoni pizzas," etc.

Ordered lists of natural language phrases are generated by ordering natural language phrases in each generated list of natural language phrases, based on occurrences of each natural language phrase, block 918. The system calculates the occurrences of each natural language phrase so that a high ordering is assigned to frequently occurring natural language phrases and a low ordering is assigned to seldom occurring natural language phrases. In embodiments, this may include the organizer 132 ordering the list of natural language pizza phrases as: "1. order delivery of a pizza," "2. where is a restaurant that serves pizzas," "3. what store has a sale on pizzas," . . . 316 based on how often these natural language phrases occur in the natural language model 114.

In another example, the organizer 132 orders the list of natural language "order a pizza" phrases 728 as: "1. order delivery of a large pepperoni pizza," "2. which restaurant serves a medium pizza with mushrooms," "3. which store sells a large pepperoni pizza," "4. order delivery of a medium pepperoni pizza," "5. which restaurant serves a large pepperoni pizza," "6. order delivery of a large pizza with bacon," etc., based on how often these natural language phrases occur in the natural language model 114.

Ordered lists of tagged natural language phrases are optionally generated by using each tagged object in the phrase to replace instances of each tagged object in the ordered lists of natural language phrases, block 920. The system can replace the instances of each tagged object in the ordered lists with the corresponding tagged object so that generalized versions of the natural language phrases can be merged from the different ordered lists. For example, and without limitation, this may include the instantiator 134 referencing instantiation records, determining that the tagged object "@food" was previously replaced with the instance "pizza," and using the tagged object "@food" to replace each instance of "pizza," in the ordered list of natural language pizza phrases. These replacements create an ordered list of tagged natural language phrases 322: "1. order delivery of @food," "2. where is a restaurant that serves @food," "3. what store has a sale on @food," etc. in another example, the instantiator 134 references instantiation records, determines that the tagged attribute "@ size" was previously replaced with the instance "large," determines that the tagged attribute "@ingredient" was previously replaced with the instance "pepperoni," determines that "pizza" is an instance of the object "food," uses the tagged attribute "@ size" to replace each instance of "large," the tagged attribute "@ingredient" to replace each instance of "pepperoni," and the tagged object "@food" to replace each instance of "pizza" in the ordered list of natural language "order a pizza" phrases 728. Continuing the other example, the replacements create an ordered list of tagged natural language phrases 734: "1. order delivery of a @size @ingredient @food," "2. which restaurant serves @size @food with @ingredient," "3. which store sells @size @ingredient @food," "4. order delivery of a @size @ingredient @food," "5. which restaurant serves @size @ingredient @food," "6. order delivery of @size @food with @ingredient," etc.

A merged list of tagged natural language phrases is optionally generated by merging corresponding tagged natural language phrases that match each other, block 922. The system can merge some of these tagged natural language phrases that match from the different ordered lists. By way of example and without limitation, this may include the organizer 132 merging "1. order delivery of @food" from the ordered list 322 with "2. order delivery of @food" from the ordered list 324 and "3. order delivery of @food" from the ordered list 326 to produce the merged tagged natural language phrase "order delivery of @food." In another example, the organizer 132 merges "1. order delivery of a @size @ingredient @food," "and 4. order delivery of a @size @ingredient @food," from the ordered list 734 with "1. order delivery of a @size @ingredient @food," "and 4. order delivery of a @size @ingredient @food," from the ordered list 736 to produce the merged tagged natural language phrase "order delivery of a @ size @ ingredient @ food."

An ordered list of tagged natural language phrases is optionally generated by ordering the merged list of tagged natural language phrases based on occurrences of each corresponding natural language phrase, block 924. The system can order the tagged natural language phrases within the merged list of tagged natural language phrases based on how often their natural language phrases occur. In embodiments, this may include the organizer 132 counting 29 occurrences of "order delivery of a pizza," 13 occurrences of "order delivery of a taco," and 3 occurrences of "order delivery of an apple" in the natural language model 122, such that the total count is 45 for the merged phrase "order delivery of @food." The resulting ordered list of tagged natural language phrases 330 is "1. order delivery of @food" (based on a count of 45), "2. where is a restaurant that serves @food" (based on a count of 40), "3. what store has a sale on @food" (based on a count of 33), "4. what store sells @food" (based on a count of 11), etc. In another example, the organizer 132 counts 29 occurrences of "order delivery of a large pepperoni pizza," 23 occurrences of "order delivery of a large beef taco," 19 occurrences of "order delivery of a medium pepperoni pizza," and 17 occurrences of "order delivery of a medium beef taco," such that the total count is 88 for the merged phrase "order delivery of a @size @ingredient @food."

An enhanced set of natural language phrases is optionally generated by instantiations of each tagged object in the ordered list of tagged natural language phrases, block 926. The system can instantiate the ordered list of tagged natural language phrases to generate an enhanced set of natural language phrases to be annotated. For example, and without limitation, this may include the instantiator 134 instantiating "1. order delivery of @food" in the list 330 as "order delivery of a pizza," "order delivery of a taco," and "order delivery of an apple." In another example, the instantiator 134 instantiates "1. order delivery of @size @ingredient @food" in the list 740 as "order delivery of a large pepperoni pizza," "order delivery of a large bacon pizza," "order delivery of a medium pepperoni pizza," "order delivery of a medium bacon pizza," "order delivery of a small pepperoni pizza," "order delivery of a small bacon pizza," "order delivery of a large beef taco," "order delivery of a large chicken taco," "order delivery of a medium beef taco," "order delivery of a medium chicken taco," "order delivery of a small beef taco," and "order delivery of a small chicken taco," etc. 742.

Annotated natural language phrases are generated by using each tagged object in the phrase to annotate the ordered lists of natural language phrases or the enhanced set of natural language phrases that is based on the ordered lists of natural language phrases, block 928. The system annotates natural language phrases for training the NLU engine 130. By way of example and without limitation, this may include the annotator 138 referencing instantiation records, determining that the tagged object "@food" was previously replaced with the instance "pizza," and using the tagged object "@food" to annotate "pizza" in the enhanced set of natural language phrases, thereby creating the annotated natural language phrase "order delivery of a pizza (@food)." In another example, the annotator 138 references instantiation records, determines that the tagged attribute "@ size" was previously replaced with the instance "large," determines that the tagged attribute "@ingredient" was previously replaced with the instance "pepperoni," determines that "pizza" is an instance of the object "food," and uses the tagged attribute "@ size" to annotate "large," the tagged object "@ingredient" to annotate "pepperoni" and the tagged object "@food" to annotate "pizza" in the enhanced set of natural language phrases, thereby creating the annotated natural language phrase "order delivery of a large (@ size) pepperoni (@ingredient) pizza (@food)."

The annotated natural language phrases are optionally used to train a NLU engine to understand a natural language phrase from a user, thereby enabling a response, block 930. The system can use annotated natural language phrases to train the NLU engine 130. In embodiments, this may include the trainer 126 using the annotated natural language phrases 336 to train the NLU engine 130, and the natural language server 106 providing a copy of the personal digital assistant 128 to the smartphone 102. Continuing the example, a person uses the smartphone 102 and says the phrase "order delivery of a pizza," the NLU engine 130 understands the phrase, which helps the personal digital assistant 128 to prompt the person for details such as pizza size and toppings, the restaurant to make the pizza, and delivery time and location. In another example, the trainer 126 uses the annotated natural language phrases 744 to train the NLU engine 130, and the natural language server 106 provides a copy of the personal digital assistant 128 to the smartphone 102. Continuing the example, a person uses the smartphone 102 and says the phrase "order delivery of a large pepperoni pizza," the NLU engine 130 understands the phrase. This helps the personal digital assistant 128 to prompt the person for details, such as the restaurant to make the pizza, and delivery time and location.

Although FIG. 9 depicts the blocks 902-930 occurring in a specific order, the blocks 902-930 may occur in another order. In other implementations, each of the blocks 902-930 may also be executed in combination with other blocks and/or some blocks may be divided into a different set of blocks.

Figure 10:
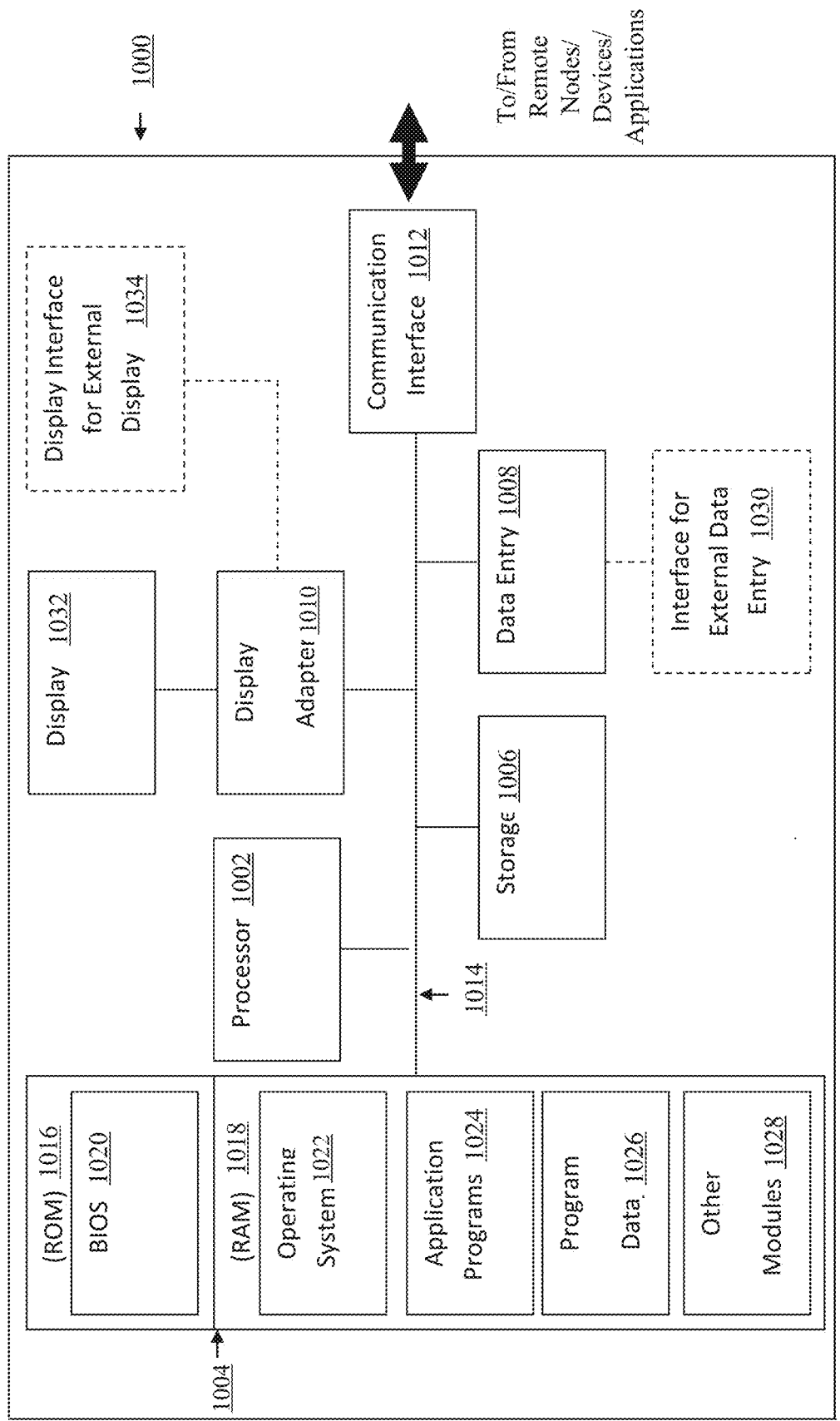
FIG. 10 is a block diagram illustrating an example hardware device in which the subject matter may be implemented.

An exemplary hardware device in which the subject matter may be implemented shall be described. Those of ordinary skill in the art will appreciate that the elements illustrated in FIG. 10 may vary depending on the system implementation. With reference to FIG. 10, an exemplary system for implementing the subject matter disclosed herein includes a hardware device 1000, including a processing unit 1002, a memory 1004, a storage 1006, a data entry module 1008, a display adapter 1010, a communication interface 1012, and a bus 1014 that couples elements 1004-1012 to the processing unit 1002.

The bus 1014 may comprise any type of bus architecture. Examples include a memory bus, a peripheral bus, a local bus, etc. The processing unit 1002 is an instruction execution machine, apparatus, or device and may comprise a microprocessor, a digital signal processor, a graphics processing unit, an application specific integrated circuit (ASIC), a field programmable gate array (FPGA), etc. The processing unit 1002 may be configured to execute program instructions stored in the memory 1004 and/or the storage 1006 and/or received via the data entry module 1008.

The memory 1004 may include a read only memory (ROM) 1016 and a random access memory (RAM) 1018. The memory 1004 may be configured to store program instructions and data during operation of the device 1000. In various embodiments, the memory 1004 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 1004 may also include nonvolatile memory technologies such as nonvolatile flash RAM (NVRAM) or ROM. In some embodiments, it is contemplated that the memory 1004 may include a combination of technologies such as the foregoing, as well as other technologies not specifically mentioned. When the subject matter is implemented in a computer system, a basic input/output system (BIOS) 1020, containing the basic routines that help to transfer information between elements within the computer system, such as during start-up, is stored in the ROM 1016.

The storage 1006 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1000.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1006, the ROM 1016 or the RAM 1018, including an operating system 1022, one or more applications programs 1024, program data 1026, and other program modules 1028. A user may enter commands and information into the hardware device 1000 through data entry module 1008. The data entry module 1008 may include mechanisms such as a keyboard, a touch screen, a pointing device, etc. Other external input devices (not shown) are connected to the hardware device 1000 via an external data entry interface 1030. By way of example and not limitation, external input devices may include a microphone, joystick, game pad, satellite dish, scanner, or the like. In some embodiments, external input devices may include video or audio input devices such as a video camera, a still camera, etc. The data entry module 1008 may be configured to receive input from one or more users of the device 1000 and to deliver such input to the processing unit 1002 and/or the memory 1004 via the bus 1014.

A display 1032 is also connected to the bus 1014 via the display adapter 1010. The display 1032 may be configured to display output of the device 1000 to one or more users. In some embodiments, a given device such as a touch screen, for example, may function as both the data entry module 1008 and the display 1032. External display devices may also be connected to the bus 1014 via the external display interface 1034. Other peripheral output devices, not shown, such as speakers and printers, may be connected to the hardware device 1000.

The hardware device 1000 may operate in a networked environment using logical connections to one or more remote nodes (not shown) via the communication interface 1012. The remote node may be another computer, a server, a router, a peer device or other common network node, and typically includes many or all of the elements described above relative to the hardware device 1000. The communication interface 1012 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1012 may include logic configured to support direct memory access (DMA) transfers between the memory 1004 and other devices.

In a networked environment, program modules depicted relative to the hardware device 1000, or portions thereof, may be stored in a remote storage device, such as, for example, on a server. It will be appreciated that other hardware and/or software to establish a communications link between the hardware device 1000 and other devices may be used.

It should be understood that the arrangement of the hardware device 1000 illustrated in FIG. 10 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 1000.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 10.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions that, when executed, cause the one or more processors to:
   receive a phrase that includes at least one tagged object;
   generate instantiated phrases by instantiations of the at least one tagged object in the phrase;
   generate lists of natural language phrases by generating corresponding paraphrases of the instantiated phrases;
   generate ordered lists of natural language phrases by ordering natural language phrases in the lists of natural language phrases based on occurrences of the natural language phrases; and
   generate annotated natural language phrases by using the at least one tagged object in the phrase to annotate one of the ordered lists of natural language phrases and an enhanced set of natural language phrases that is based on the ordered lists of natural language phrases.

2. The system of claim 1, wherein the plurality of instructions, when executed, further cause the one or more processors to:
   identify a first attribute and a second attribute of an object in a specified one of the natural language phrases, in response to receiving the specified natural language phrase;
   create two permutations of the specified natural language phrase for each attribute by inserting each attribute as a second tagged object before the object in the specified natural language phrase and by inserting each attribute as a third tagged object after the object in the specified natural language phrase; and
   create combined instantiated phrases by combining a permutation of an instantiated phrase associated with the first attribute and a permutation of an instantiated phrase associated with the second attribute.

3. The system of claim 1, wherein the plurality of instructions, when executed, further cause the one or more processors to identify an object as an attribute of a first tagged object of the at least one tagged object and insert the object as a second tagged object into the phrase;
   wherein the instructions that cause the one or more processors to identify the object comprise instructions that cause the one or more processors to output identified objects as attributes of the first tagged object and receive a selection of at least one identified object; and
   wherein the instructions that cause the one or more processors to insert the object comprise instructions that cause the one or more processors to insert the at least one identified object as the second tagged object into the phrase.

4. The system of claim 1, wherein the plurality of instructions, when executed, further cause the one or more processors to:
   generate lists of tagged natural language phrases by using the at least one tagged object in the phrase to replace instances of each tagged object in the ordered lists of natural language phrases;
   generate a merged list of tagged natural language phrases by merging corresponding tagged natural language phrases that match each other;
   generate an ordered list of tagged natural language phrases by ordering the merged list of tagged natural language phrases based on occurrences of the corresponding natural language phrases; and
   generate the enhanced set of natural language phrases by instantiations of the at least one tagged object in the ordered list of tagged natural language phrases.

5. The system of claim 1, wherein the plurality of instructions, when executed, further cause the one or more processors to use the annotated natural language phrases to train a natural language understanding engine to understand a natural language phrase from a user, thereby enabling a response.

6. The system of claim 1, wherein:
   the phrase includes a verb; and
   the instructions that cause the one or more processors to generate the annotated natural language phrases comprise instructions that cause the one or more processors to use the verb to annotate one of the ordered lists of natural language phrases and the enhanced set of natural language phrases that is based on the ordered lists of natural language phrases.

7. The system of claim 1, wherein the instructions that cause the one or more processors to generate the ordered lists of natural language phrases comprise instructions that cause the one or more processors to delete any natural language phrases that are ordered lower than a threshold order value in the ordered lists.

8. A method comprising:
receiving a phrase that includes at least one tagged object;
generating instantiated phrases by instantiations of the at least one tagged object in the phrase;
generating lists of natural language phrases by generating corresponding paraphrases of the instantiated phrases;
generating ordered lists of natural language phrases by ordering natural language phrases in the lists of natural language phrases based on occurrences of the natural language phrases; and
generating annotated natural language phrases by using the at least one tagged object in the phrase to annotate one of the ordered lists of natural language phrases and an enhanced set of natural language phrases that is based on the ordered lists of natural language phrases.

9. The method of claim 8, wherein the method further comprises:
identifying a first attribute and a second attribute of an object in a specified one of the natural language phrases, in response to receiving the specified natural language phrase;
creating two permutations of the specified natural language phrase for each attribute by inserting each attribute as a second tagged object before the object in the specified natural language phrase and by inserting each attribute as a third tagged object after the object in the specified natural language phrase; and
creating combined instantiated phrases by combining a permutation of an instantiated phrase associated with the first attribute and a permutation of an instantiated phrase associated with the second attribute.

10. The method of claim 8, wherein the method further comprises identifying an object as an attribute of a first tagged object of the at least one tagged object and inserting the object as a second tagged object into the phrase;
wherein identifying the object comprises outputting identified objects as attributes of the first tagged object and receiving a selection of at least one identified object; and
wherein inserting the object comprises inserting the at least one identified object as the second tagged object into the phrase.

11. The method of claim 8, wherein the method further comprises:
generating lists of tagged natural language phrases by using the at least one tagged object in the phrase to replace instances of each tagged object in the ordered lists of natural language phrases;
generating a merged list of tagged natural language phrases by merging corresponding tagged natural language phrases that match each other;
generating an ordered list of tagged natural language phrases by ordering the merged list of tagged natural language phrases based on occurrences of the corresponding natural language phrases; and
generating the enhanced set of natural language phrases by instantiations of the at least one tagged object in the ordered list of tagged natural language phrases.

12. The method of claim 8, wherein the method further comprises:
using the annotated natural language phrases to train a natural language understanding engine to understand a natural language phrase from a user, thereby enabling a response.

13. The method of claim 8, wherein:
the phrase includes a verb; and
generating the annotated natural language phrases comprises using the verb to annotate one of the ordered lists of natural language phrases and the enhanced set of natural language phrases that is based on the ordered lists of natural language phrases.

14. A non-transitory computer program product comprising computer-readable program code, the program code including instructions that when executed cause one or more processors to:
receive a phrase that includes at least one tagged object;
generate instantiated phrases by instantiations of the at least one tagged object in the phrase;
generate lists of natural language phrases by generating corresponding paraphrases of the instantiated phrases;
generate ordered lists of natural language phrases by ordering natural language phrases in the lists of natural language phrases based on occurrences of the natural language phrases; and
generate annotated natural language phrases by using the at least one tagged object in the phrase to annotate one of the ordered lists of natural language phrases and an enhanced set of natural language phrases that is based on the ordered lists of natural language phrases.

15. The non-transitory computer program product of claim 14, wherein the program code further includes instructions that when executed cause the one or more processors to:
identify a first attribute and a second attribute of an object in a specified one of the natural language phrases, in response to receiving the specified natural language phrase;
create two permutations of the specified natural language phrase for each attribute by inserting each attribute as a second tagged object before the object in the specified natural language phrase and by inserting each attribute as a third tagged object after the object in the specified natural language phrase; and
create combined instantiated phrases by combining a permutation of an instantiated phrase associated with the first attribute and a permutation of an instantiated phrase associated with the second attribute.

16. The non-transitory computer program product of claim 14, wherein the program code further includes instructions that when executed cause the one or more processors to identify an object as an attribute of a first tagged object of the at least one tagged object and insert the object as a second tagged object into the phrase;
wherein the instructions that cause the one or more processors to identify the object comprise instructions that cause the one or more processors to output identified objects as attributes of the first tagged object and receive a selection of at least one identified object; and
wherein the instructions that cause the one or more processors to insert the object comprise instructions that cause the one or more processors to insert the at least one identified object as the second tagged object into the phrase.

17. The non-transitory computer program product of claim 14, wherein the program code further includes instructions that when executed cause the one or more processors to:
generate lists of tagged natural language phrases by using the at least one tagged object in the phrase to replace instances of each tagged object in the ordered lists of natural language phrases;

generate a merged list of tagged natural language phrases by merging corresponding tagged natural language phrases that match each other;

generate an ordered list of tagged natural language phrases by ordering the merged list of tagged natural language phrases based on occurrences of the corresponding natural language phrases; and generate the enhanced set of natural language phrases by instantiations of the at least one tagged object in the ordered list of tagged natural language phrases.

18. The non-transitory computer program product of claim 14, wherein the program code further includes instructions that when executed cause the one or more processors to use the annotated natural language phrases to train a natural language understanding engine to understand a natural language phrase from a user, thereby enabling a response.

19. The non-transitory computer program product of claim 14, wherein:

the phrase includes a verb; and the instructions that cause the one or more processors to generate the annotated natural language phrases comprise instructions that cause the one or more processors to use the verb to annotate one of the ordered lists of natural language phrases and the enhanced set of natural language phrases that is based on the ordered lists of natural language phrases.

20. The non-transitory computer program product of claim 14, wherein the instructions that cause the one or more processors to generate the ordered lists of natural language phrases comprise instructions that cause the one or more processors to delete any natural language phrases that are ordered lower than a threshold order value in the ordered lists.

* * * * *